(12) United States Patent
Sasaki et al.

(10) Patent No.: US 12,308,466 B2
(45) Date of Patent: May 20, 2025

(54) VALVE DEVICE FOR POWER STORAGE DEVICE AND POWER STORAGE DEVICE

(71) Applicant: DAI NIPPON PRINTING CO., LTD., Tokyo (JP)

(72) Inventors: Miho Sasaki, Tokyo (JP); Atsuko Takahagi, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 1060 days.

(21) Appl. No.: 17/280,106

(22) PCT Filed: Sep. 25, 2019

(86) PCT No.: PCT/JP2019/037534
§ 371 (c)(1),
(2) Date: Mar. 25, 2021

(87) PCT Pub. No.: WO2020/067130
PCT Pub. Date: Apr. 2, 2020

(65) Prior Publication Data
US 2022/0006155 A1    Jan. 6, 2022

(30) Foreign Application Priority Data
Sep. 25, 2018    (JP) .................................. 2018-179525

(51) Int. Cl.
*H01M 50/367*    (2021.01)
*H01G 11/80*    (2013.01)

(52) U.S. Cl.
CPC .......... *H01M 50/367* (2021.01); *H01G 11/80* (2013.01); *H01M 2200/20* (2013.01)

(58) Field of Classification Search
CPC ............. H01M 50/325; H01M 50/333; H01M 50/367; H01M 2200/20; H01M 50/30; H01M 50/317
See application file for complete search history.

(56) References Cited

U.S. PATENT DOCUMENTS 6,039,301 A * 3/2000 Westerhof ............ B67D 7/0294
                                           251/353
7,150,936 B2    12/2006 Tukawaki et al.
(Continued)

FOREIGN PATENT DOCUMENTS

| CN | 204793061 U | 11/2015 |
|----|-------------|---------|
| JP | H04-328241 A | 11/1992 |

(Continued)

OTHER PUBLICATIONS

May 24, 2022 Extended Search Report issued in European Patent Application No. 19864300.9.

(Continued)

*Primary Examiner* — Imran Akram
(74) *Attorney, Agent, or Firm* — Oliff PLC

(57) ABSTRACT

A valve device for a power storage device that can, when a gas is generated inside the power storage device, release the gas to the outside, and can highly prevent the intrusion of moisture from an external environment, the power storage device including: a power storage device element and a housing in which the element is housed, the valve device being attached to the housing, wherein the valve device is configured to reduce an internal pressure of the housing when the pressure increases due to a gas generated inside, and in the valve device, an amount of helium leakage from a secondary side to a primary side is $5.0 \times 10^{-11}$ Pa·m³/sec or more and $5.0 \times 10^{-6}$ Pa·m³/sec or less, as measured in a 25° C. environment, in accordance with a method defined in "Vacuum spraying method (spray method)" of "Method for helium leak testing" in JIS Z 2331: 2006.

14 Claims, 25 Drawing Sheets

(56) References Cited

U.S. PATENT DOCUMENTS

| | | | | |
|---|---|---|---|---|
| 2003/0207169 | A1* | 11/2003 | Tukawaki | H01M 10/4285 429/90 |
| 2005/0058898 | A1* | 3/2005 | Dokko | H01M 50/581 429/175 |
| 2005/0069759 | A1* | 3/2005 | Shimamura | H01M 50/317 429/61 |
| 2009/0081542 | A1* | 3/2009 | Yageta | H01G 9/08 429/185 |
| 2014/0120387 | A1 | 5/2014 | Kinuta et al. | |
| 2016/0020452 | A1 | 1/2016 | Choi et al. | |
| 2016/0036024 | A1* | 2/2016 | Choi | H01M 50/105 429/54 |
| 2016/0087304 | A1 | 3/2016 | Tsukui | |

FOREIGN PATENT DOCUMENTS

| | | |
|---|---|---|
| JP | H6-235680 A | 8/1994 |
| JP | H11-250887 A | 9/1999 |
| JP | 2006-179442 A | 7/2006 |
| JP | 2011-155139 A | 8/2011 |
| JP | 2016-25083 A | 2/2016 |
| JP | 2016-152231 A | 8/2016 |
| JP | 2018-137173 A | 8/2018 |
| KR | 10-2014-0049737 A | 4/2014 |
| KR | 10-2014-0067246 A | 6/2014 |
| WO | 2009/001947 A1 | 12/2008 |
| WO | 2013/146803 A1 | 10/2013 |
| WO | 2014/171169 A1 | 10/2014 |

OTHER PUBLICATIONS

Dec. 10, 2019 International Search Report issued in International Patent Application No. PCT/JP2019/037534.
Sep. 30, 2022 Office Action issued in Chinese Patent Application No. 201980063020.4.
Apr. 25, 2023 Office Action issued in Japanese Patent Application No. 2019-109746.
May 31, 2023 Office Action issued in Chinese Patent Application No. 201980063020.4.

* cited by examiner

VALVE DEVICE FOR POWER STORAGE DEVICE AND POWER STORAGE DEVICE

TECHNICAL FIELD

The present disclosure relates to a valve device for a power storage device and a power storage device.

BACKGROUND ART

Conventionally, a technique of providing a valve device is known to release a gas generated inside a container, such as a power storage device, at a pressure lower than the burst pressure of the container. Patent Literature 1, for example, discloses an electrical double layer capacitor cell characterized in that a capacitor valve having a predetermined structure is used.

CITATION LIST

Patent Literature

Patent Literature 1: JP 2011-155139 A

SUMMARY OF INVENTION

Technical Problem

As described above, power storage devices that include valve devices as provisions for the generation of a gas inside the power storage device are known.

Higher hermeticity is required for the inside of such a power storage device, from the viewpoint of preventing the intrusion of moisture into the power storage device from an external environment.

Under such circumstances, it is a main object of the present disclosure to provide a valve device for a power storage device that, when a gas is generated inside the power storage device, can release the gas to the outside, and can highly prevent the intrusion of moisture from an external environment.

Solution to Problem

The inventors of the present disclosure have conducted extensive research to solve the aforementioned problem. As a result, they have found that, in a valve device for a power storage device, the power storage device including a power storage device element and a housing in which the power storage device element is housed, the valve device for being attached to the housing of the power storage device, when the valve device is configured to reduce an internal pressure of the housing when the pressure increases due to a gas generated inside the housing, and the amount of helium leakage from a secondary side to a primary side of the valve device is set to a predetermined value, as measured in a 25° C. environment, in accordance with a method defined in "Vacuum spraying method (spray method)" of "Method for helium leak testing" in JIS Z 2331: 2006, the valve device can, when a gas is generated inside the power storage device, release the gas to the outside, and can highly prevent the intrusion of moisture from an external environment. The ability to more highly prevent the intrusion of moisture into the power storage device from an external environment can lead to, for example, an extended lifetime of the power storage device.

The present disclosure has been completed as a result of further research based on this finding. In summary, the present disclosure provides an embodiment of the invention as set forth below:

A valve device for a power storage device, the power storage device including a power storage device element and a housing in which the power storage device element is housed, the valve device for being attached to the housing of the power storage device, wherein the valve device is configured to reduce an internal pressure of the housing when the pressure increases due to a gas generated inside the housing, and in the valve device, an amount of helium leakage from a secondary side to a primary side of the valve device is $5.0 \times 10^{-11}$ Pa·m$^3$/sec or more and $5.0 \times 10^{-6}$ Pa·m$^3$/sec or less, as measured in a 25° C. environment, in accordance with a method defined in "Vacuum spraying method (spray method)" of "Method for helium leak testing" in JIS Z 2331: 2006.

Advantageous Effects of Invention

The present disclosure can provide a valve device for a power storage device that, when a gas is generated inside the power storage device, can release the gas to the outside, and can highly prevent the intrusion of moisture from an external environment.

DESCRIPTION OF EMBODIMENTS

Figure 1:
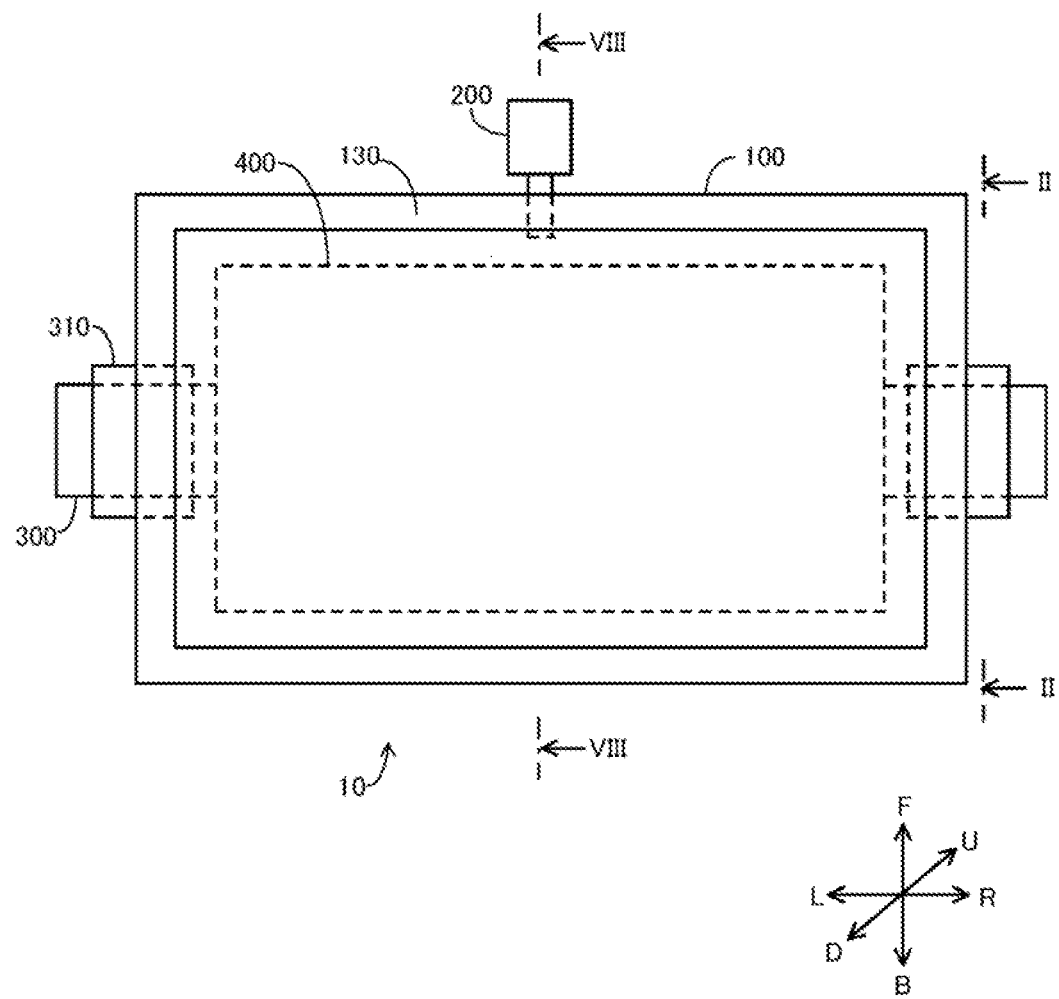
FIG. 1 is a plan view of a power storage device according to a first embodiment to which a valve device of the present disclosure can be applied.

A valve device for a power storage device of the present disclosure is a valve device for a power storage device, the power storage device including a power storage device element and a housing in which the power storage device element is housed, the valve device for being attached to the housing of the power storage device. The valve device for a power storage device of the present disclosure is attached to the housing so as to communicate with an inside of the housing. The valve device of the present disclosure has features in that the valve device is configured to reduce an internal pressure of the housing when the pressure increases due to a gas generated inside the housing, and an amount of helium leakage from a secondary side to a primary side of the valve device is $5.0 \times 10^{-11}$ Pa·m$^3$/sec or more and $5.0 \times 10^{-6}$ Pa·m$^3$/sec or less, as measured in a 25° C. environment, in accordance with a method defined in "Vacuum spraying method (spray method)" of "Method for helium leak testing" in JIS Z 2331: 2006. Specifically, the valve device for a power storage device is a check valve that satisfies the above-described amount of helium leakage. In the evaluation of the gas-tightness of the valve device for a power storage device of the present disclosure, helium is used instead of conventionally used air, and the amount of helium leakage is set in the above-described range, such that the valve device can achieve higher-precision gas-tightness. As a result, the valve device can, when a gas is generated inside the power storage device, release the gas to the outside, and can highly prevent the intrusion of moisture (such as water vapor in air) from an external environment. This can lead to, for example, an extended lifetime of the power storage device.

The valve device for a power storage device of the present disclosure will be hereinafter described in detail. In the present specification, any numerical range indicated by " . . . to . . . " is intended to mean " . . . or more" and " . . . or less". For example, the recitation "2 to 15 mm" is intended to mean 2 mm or more and 15 mm or less. Subsequently, below-described specific embodiments of the valve device for a power storage device will be described in detail with reference to the drawings. In the drawings, identical or equivalent elements are labeled with identical signs, and the description is not repeated.

The valve device for a power storage device of the present disclosure is not limited in terms of valve mechanism, as long as the amount of helium leakage from the secondary side to the primary side of the valve device is set in the range of $5.0 \times 10^{-11}$ Pa·m$^3$/sec or more and $5.0 \times 10^{-6}$ Pa·m$^3$/sec or less, as measured in a 25° C. environment, in accordance with the method defined in "Vacuum spraying method (spray method)" of "Method for helium leak testing" in JIS Z 2331: 2006. Specifically, the valve device includes the secondary side positioned outside the housing of the power storage device (i.e., in an external environment) and the primary side positioned inside the housing of the power storage device, and is configured to reduce an internal pressure of the housing when the pressure increases due to a gas generated inside the housing (i.e., allow the gas generated inside the housing to be released from the primary side toward the secondary side). A preferred embodiment of the structure of the valve device will be described below. The primary side of the valve device refers to the inside of the housing; in a valve device 200 shown in the schematic diagram of FIG. 1, it refers to direction B of the valve device. The secondary side of the valve device refers to the outside of the housing; in the valve device 200 shown in the schematic diagram of FIG. 1, it refers to direction F of the valve device.

In the valve device for a power storage device of the present disclosure, the upper limit of the amount of helium leakage is preferably about $4.5 \times 10^{-6}$ Pa·m$^3$/sec or less, more preferably about $1.0 \times 10^{-6}$ Pa·m$^3$/sec or less, still more preferably about $1.0 \times 10^{-7}$ Pa·m$^3$/sec or less, and even more preferably about $1.0 \times 10^{-8}$ Pa·m$^3$/sec or less, while the lower limit is $5.0 \times 10^{-11}$ Pa·m$^3$/sec or more. Preferred ranges include from about $5.0 \times 10^{-11}$ Pa·m$^3$/sec to $4.5 \times 10^{-6}$ Pa·m$^3$/sec; from about $5.0 \times 10^{-11}$ Pa·m$^3$/sec to $1.0 \times 10^{-6}$ Pa·m$^3$/sec; from about $5.0 \times 10^{-11}$ Pa·m$^3$/sec to $1.0 \times 10^{-7}$ Pa·m$^3$/sec; and from about $5.0 \times 10^{-11}$ Pa·m$^3$/sec to $1.0 \times 10^{-8}$ Pa·m$^3$/sec. When the amount of helium leakage satisfies the above-described upper limit, the valve device for a power storage device of the present disclosure can highly prevent the intrusion of moisture from an external environment. Moreover, when the amount of helium leakage satisfies the above-described lower limit, the valve device for a power storage device of the present disclosure can, when a gas is generated inside the power storage device, release the gas to the outside. If the amount of helium leakage is excessively small, it will be difficult for the valve device to stably release the gas generated inside the power storage device to the outside. Alternatively, if the power storage device is used without the valve device being opened for a long period of time, the valve device is likely to have the problem of not being properly opened, even if the internal pressure increases to a set value.

Furthermore, in the valve device for a power storage device of the present disclosure, when the amount of helium leakage is set in the range of about $5.0 \times 10^{-11}$ Pa·m$^3$/sec to $2.0 \times 10^{-10}$ Pa·m$^3$/sec, or even in the range of about $5.0 \times 10^{-11}$ Pa·m$^3$/sec to $1.5 \times 10^{-10}$ Pa·m$^3$/sec, the valve device can particularly highly prevent the intrusion of moisture from an external environment. In order to set the amount of helium leakage in this range, as described below, the shape of the region where the valve seat and the ball of the valve mechanism are in contact with each other needs to be designed and processed with extremely high precision, at a high level heretofore unattained in conventional check valves.

The amount of helium leakage of the valve device for a power storage device of the present disclosure is the value measured using a helium leak test. Detailed measurement conditions for the helium leak test are as follows:

<Helium Leak Test>

The amount of helium leakage from the secondary side to the primary side of the valve device is measured in accordance with the method defined in "Vacuum spraying method (spray method)" of "Method for helium leak testing" in JIS Z 2331: 2006. Specifically, a helium leak detector is used as a testing apparatus. The gas valve of the valve device is mounted in a leak test jig (when a dummy valve device having a blocked gas valve is placed in a leak test jig, the jig is previously verified to have no helium leak), and then to the helium leak detector via a test port. It is also verified that there is no helium leak between the jig and the helium leak detector. Thereafter, the valve device is evacuated to 13 Pa from the primary side, and then 99.99% helium gas is sprayed to the valve device from the secondary side, and measurement is started. The spraying is performed for 1 to 2 seconds, and the waiting time is 2 to 4 seconds. The evaluation results are recorded. As a precaution, the same valve may be covered with a hood having a volume of 50 ml and allowed to wait for 20 seconds, in accordance with the method defined in "Vacuum covering method (vacuum hood method)" of "Method for helium leak testing" in JIS Z 2331: 2006, to verify that the same measurement results are obtained. The measurement environment temperature is 25° C. in both tests.

In the valve device for a power storage device of the present disclosure, with respect to the differential pressure between the primary side and the secondary side (i.e., the opening pressure of the valve device), the lower limit is preferably about 0.05 MPa or more, and more preferably about 0.1 MPa or more, while the upper limit is preferably about 1 MPa or less, and more preferably about 0.3 MPa or less. Preferred ranges include from about 0.05 to 1 MPa; from about 0.05 to 0.3 MPa; from about 0.1 to 1 MPa; and from about 0.1 to 0.3 MPa. When the valve device for a power storage device of the present disclosure satisfies this differential pressure, it can, when a gas is generated inside the power storage device, favorably release the gas to the outside, and can highly prevent the intrusion of moisture from an external environment.

The internal pressure of the power storage device to which the valve device for a power storage device of the present disclosure is applied is preferably set to be equal to or less than a certain pressure. While the set value of the internal pressure may be set appropriately according to the type of the package attached with the valve device, it is preferably about 0.1 MPa or less, and more preferably about $1.0 \times 10^{-2}$ MPa or less, while the lower limit is about $1.0 \times 10^{-10}$ MPa or more, for example. Preferred ranges of the internal pressure include from about $1.0 \times 10^{-10}$ to 0.1 MPa; and from about $1.0 \times 10^{-10}$ to $1.0 \times 10^{-2}$ MPa.

The power storage device to which the valve device for a power storage device of the present disclosure is applied includes a power storage device element, a housing, and a valve device. The housing is formed of a metal, for example. When the housing is formed of a metal, it may have a shape such as a cylindrical can or a rectangular can. The housing may be formed of a laminate including at least a base material layer, a barrier layer, and a heat-sealable resin layer in this order. A preferred embodiment of the housing of the power storage device to which the valve device for a power storage device of the present disclosure is applied will be described later.

In the valve device for a power storage device of the present disclosure, the amount of helium leakage is set to $5.0 \times 10^{-11}$ Pa·m$^3$/sec or more and $5.0 \times 10^{-6}$ Pa·m$^3$/sec or less, such that the valve device can, when a gas is generated inside the power storage device, release the gas to the outside, and can highly prevent the intrusion of moisture from an external environment.

In the valve device for a power storage device of the present disclosure, the setting of the amount of helium leakage can be accomplished using a known method. For example, the amount of helium leakage can be adjusted by designing the materials, shapes, and sizes of the members (such as the below-described ball, valve seat (for example, an O-ring), spring, and vent) constituting the valve mechanism of the valve device, and also the force to press the ball applied by the spring. For example, when an elastic body is used as one of the ball and the valve seat of the valve mechanism, and a member having a high hardness, such as a metal, is used as the other, the amount of helium leakage can be readily set in the range of $5.0 \times 10^{-11}$ Pa·m$^3$/sec or more and $5.0 \times 10^{-6}$ Pa·m$^3$/sec or less. To reduce the amount of helium leakage, for example, it would be effective to use elastomer bodies as both the ball and the valve seat of the valve mechanism; however, as described above, if the amount of helium leakage is excessively small, it will be difficult for the valve device to properly release the gas generated inside the power storage device to the outside. Therefore, the materials, shapes, sizes, and the like of the members constituting the valve mechanism are appropriately adjusted. For example, when the place of the valve seat that touches the ball in the valve mechanism has a shape that conforms to the surface shape of the ball, the amount of helium leakage can be readily set in the above-described range. In the valve device for a power storage device of the present disclosure, in order to set the amount of helium leakage in the range of about $5.0 \times 10^{-11}$ Pa·m$^3$/sec to $2.0 \times 10^{-10}$ Pa·m$^3$/sec, or even in the range of about $5.0 \times 10^{-11}$ Pa·m$^3$/sec to $1.5 \times 10^{-10}$ Pa·m$^3$/sec, the shape of the region where the valve seat and the ball of the valve mechanism are in contact with each other needs to be designed and processed with extremely high precision, at a high level heretofore unattained in conventional check valves. It is, for example, effective to set the average surface roughness of the place of the valve seat that contacts the ball and the average surface roughness of the ball surface to 20 or less, preferably 5 μm or less, and more preferably 1 μm or less. However, if members of excessively high precision are contacted with each other, the valve device may have the problem of not being properly opened. Therefore, the surface roughness needs to be adjusted such that the amount of helium leakage falls in the above-described range.

Hereinafter, preferred embodiments of the structure and the like of the valve device for a power storage device of the present disclosure will be illustrated.

The valve device for a power storage device of the present disclosure preferably includes a first portion and a second portion. The first portion is a portion in which a valve mechanism is formed, the valve mechanism being configured to reduce an internal pressure of the housing when the pressure increases due to a gas generated inside the housing. The second portion is a portion in which a vent passage is formed, the vent passage being configured to guide the gas generated inside the housing to the valve mechanism.

For example, when the housing of the power storage device is formed of a laminate including at least a base material layer, a barrier layer, and a heat-sealable resin layer in this order, the heat-sealable resin layer is opposed to another heat-sealable resin layer on the periphery of the housing. On the periphery of the housing, a peripheral bonded portion is formed where the opposing heat-sealable resin layers are fused together. In the valve device, the first portion is preferably positioned outside an edge of the peripheral bonded portion. The second portion is at least partially sandwiched between the heat-sealable resin layers in the peripheral bonded portion.

In this power storage device, it is the second portion of the valve device that is sandwiched between the heat-sealable resin layers in the peripheral bonded portion, and the first portion of the valve device is preferably not sandwiched between the heat-sealable resin layers. In this power storage device, during fusion of the opposing heat-sealable resin layers, the first portion is less subjected to the application of high pressure and heat than the second portion. As a result, in this valve device for a power storage device, a failure of the valve mechanism in the first portion due to the pressure and heat applied during fusion of the opposing heat-sealable resin layers can be prevented.

Preferably, in a thickness direction of the power storage device, the first portion may have a length greater than a length of the second portion, and a step may be formed at a boundary between the first portion and the second portion.

In this power storage device, it is preferred that, at least in the thickness direction of the power storage device, the first portion be longer than the second portion, and a step be formed at the boundary between the first portion and the second portion. Therefore, in this power storage device, in the manufacturing process of the power storage device, during sandwiching of the second portion between the heat-sealable resin layers, even if the valve device is pushed too far into the housing, the step portion is caught by an end of the laminate. Therefore, in this power storage device, the first portion can be prevented from being erroneously sandwiched between the heat-sealable resin layers, in the manufacturing process of the power storage device. Moreover, in this power storage device, the difference between the length in the thickness direction of the power storage device in the region of the peripheral bonded portion where the second portion is sandwiched and the length in the thickness direction of the power storage device in the region of the peripheral bonded portion where the second portion is not sandwiched is small, compared to when the step is not provided at the boundary between the first and second portions. Therefore, in the region of the peripheral bonded portion where the second portion is sandwiched, the heat-sealable resin layers are fused without applying an excessive amount of heat or pressure to the heat-sealable resin layers. As a result, in this power storage device, a decrease in insulation properties and a decrease in sealing strength due to thinning of the heat-sealable resin layers can be prevented. The decrease in insulation properties is a phenomenon in which partial thinning, cracking, or the like of the heat-sealable resin causes a current to flow between the barrier (metal) layer and an electrolytic solution.

Preferably, the second portion may have a length in a width direction of the power storage device greater than the length of the second portion in the thickness direction of the power storage device.

In this power storage device, the length of the second portion in the thickness direction of the power storage device is small, compared to when the second portion has a perfectly circular cross-sectional shape (with an identical area). That is, in this power storage device, the difference between the length in the thickness direction of the power storage device in the region of the peripheral bonded portion where the second portion is sandwiched and the length in the thickness direction of the power storage device in the region of the peripheral bonded portion where the second portion is not sandwiched is small. Therefore, in the region of the peripheral bonded portion where the second portion is sandwiched, the heat-sealable resin layers are fused without applying an excessive amount of heat or pressure to the heat-sealable resin layers. As a result, in this power storage device, a decrease in insulation properties and a decrease in sealing strength due to thinning of the heat-sealable resin layers can be prevented.

Particularly preferably, the second portion has a wing-shaped extending end formed with a thickness that decreases toward an end in the width direction of the power storage device.

In this power storage device, the change in the thickness direction of the power storage device in a position of transition from the region of the peripheral bonded portion where the second portion is not sandwiched, to the region of the peripheral bonded portion where the second portion is sandwiched, is smooth, compared to when the second portion is not provided with the wing-shaped extending end. Therefore, there is no excessive force applied on the laminate at the boundary between the position where the second portion is sandwiched between the heat-sealable resin layers and the position where the second portion is not sandwiched between the heat-sealable resin layers. As a result, in this power storage device, the heat-sealable resin layers can be properly fused without applying an excessive amount of heat or pressure, such that a decrease in insulation properties and a decrease in sealing strength due to thinning of the heat-sealable resin can be prevented.

Preferably, the vent passage may have a circular cross-sectional shape.

Preferably, the vent passage may have a cross-sectional length in the width direction of the power storage device greater than a cross-sectional length of the vent passage in the thickness direction of the power storage device.

The second portion may have a pillar formed in the vent passage.

When the pillar is formed in the vent passage of the second portion, the vent passage is maintained even if pressure and heat are applied to the second portion sandwiched between the opposing heat-sealable resin layers. Therefore, in this power storage device, a failure of the vent passage in the second portion during fusion of the opposing heat-sealable resin layers can be prevented.

Preferably, an outer surface of the second portion may have a satin finish surface.

In this power storage device, the outer surface of the second portion has a satin finish surface, such that the heat-sealable resin is readily melted in an abutting position with the second portion. Therefore, in this power storage device, the second portion of the valve device can be firmly fixed to the housing, compared to when the outer surface of the second portion is smooth.

Preferably, at least one ridge portion may be formed to extend circumferentially on the outer surface of the second portion.

The ridge portion reliably comes into contact with the heat-sealable resin layers, such that it can be readily fused to the laminate. In this power storage device, the ridge portion extends circumferentially on the outer surface of the second portion. Therefore, in this power storage device, the heat-sealable resin layers and the second portion can be fused circumferentially around the second portion. Moreover, in this power storage device, the contact area between the outer surface of the second portion and the heat-sealable resin is large, compared to when the ridge portion is not formed on the second portion. Therefore, in this power storage device, the second portion of the valve device can be fixed to the housing relatively firmly. Alternatively, a plurality of the ridge portions may be formed to allow the second portion to be fixed to the housing more firmly.

Preferably, a corner in plan view of an end of the second portion opposite to the first portion may be rounded.

In this power storage device, for example, when the end opposite to the first portion is positioned inside the housing, the possibility that the end damages the power storage device element in the housing can be reduced. Moreover, in this power storage device, the possibility that the end damages the heat-sealable resin layers inside the housing, which causes a decrease in the insulation properties of the heat-sealable resin layers, can be reduced.

Preferably, a cross-sectional outer shape of the second portion may be a polygon along a center line of the vent passage taken as the normal, and corners of the polygon may be rounded.

In this power storage device, for example, when the end of the second portion opposite to the first portion is positioned inside the housing, the possibility that the region of the second portion positioned in the housing damages the power storage device element in the housing can be reduced, and also the possibility that the region of the second portion sandwiched between the heat-sealable resin layers damages the heat-sealable resin layers, which causes a decrease in the insulation properties of the heat-sealable resin layers, can be reduced. Moreover, in this power storage device, for example, when the end of the second portion opposite to the first portion is sandwiched between the heat-sealable resin layers, the possibility that the second portion damages the heat-sealable resin layers, which causes a decrease in the insulation properties of the heat-sealable resin layers, can be reduced.

Preferably, the first portion and the second portion may be formed of different materials, and the material of the first portion may have a melting point higher than a melting point of the material of the second portion. Examples of the materials of the first portion and the second portion include, but are not limited to, resins, such as polypropylene (PP), fluororesins, polyester-based resins, polyimide-based resins, polycarbonate-based resins, and acrylic resins, and metals, such as stainless steel and aluminum.

In this power storage device, even if pressure and heat are applied to the second portion during fusion of the opposing heat-sealable resin layers, the melting point of the material of the first portion is higher than the melting point of the material of the second portion, such that the first portion is unlikely to be deformed by the heat. Therefore, in this power storage device, a failure of the valve mechanism in the first portion during fusion of the opposing heat-sealable resin layers can be prevented.

Preferably, an outer surface of at least one of the first portion and the second portion may at least partially form a flat surface.

In this power storage device, the outer surface of the valve device forms a flat surface, such that the valve device is prevented from rolling. Therefore, in this power storage device, the valve device does not roll during attachment of the valve device to the housing, which facilitates positioning of the valve device.

The following illustrates specific embodiments of a power storage device to which the valve device for a power storage device of the present disclosure is preferably applied, and of the valve device, although the power storage device to which the valve device for a power storage device of the present disclosure is applied and the valve device are not limited thereto.

1. First Embodiment

<1-1. Outline of a Power Storage Device>

Figure 2:
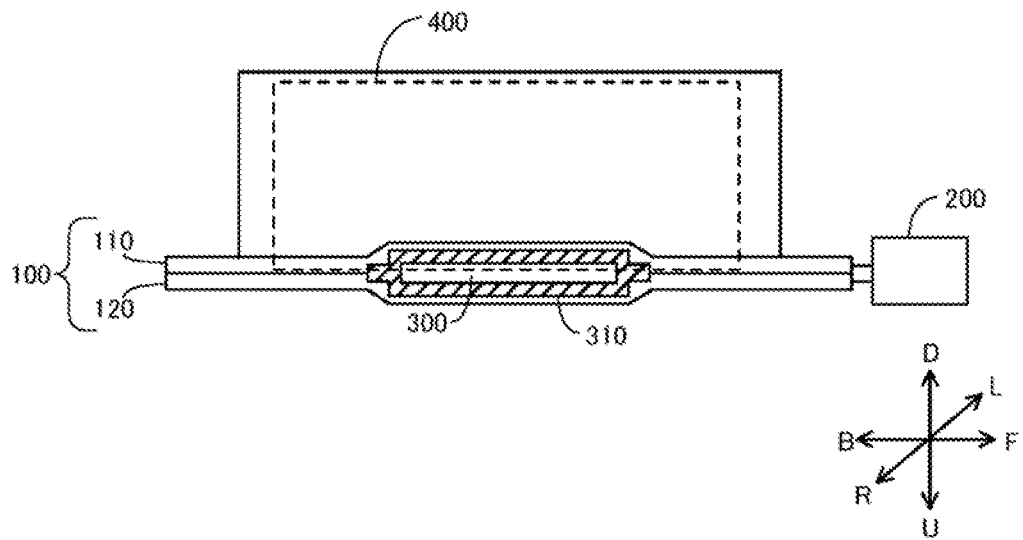
FIG. 2 is a cross-sectional view along II-II in FIG. 1.

FIG. 1 is a plan view of a power storage device 10 according to a first embodiment of the present disclosure. FIG. 2 is a cross-sectional view along II-II in FIG. 1. In the power storage device 10, a positive electrode and a negative electrode of tabs 300 are disposed on opposite sides. This configuration takes into account, for example, applications to electric vehicles such as a hybrid car and an electric car in which multiple power storage devices are connected in series and used at a high voltage.

As shown in FIGS. 1 and 2, the power storage device 10 includes a housing 100, a power storage device element 400, a tab 300, a tab film 310, and a valve device 200.

The housing 100 includes packaging materials 110, 120. On the periphery of the housing 100, the packaging materials 110, 120 are heat-sealed to form a peripheral bonded portion 130. That is, the packaging materials 110, 120 are fused together in the peripheral bonded portion 130. The packaging materials 110, 120 will be described in detail later.

The power storage device element 400 is a power storage member, for example, a lithium ion storage device or a capacitor. The power storage device element 400 is housed inside the housing 100. When an abnormality occurs in the power storage device element 400, a gas may be generated in the housing 100. For example, when the power storage device element 400 is a capacitor, a gas may be generated in the housing 100 due to a chemical reaction in the capacitor.

The tab 300 is a metal terminal used for input or output of electric power to or from the power storage device element 400. One end of the tab 300 is electrically connected to an electrode (the positive electrode or the negative electrode) of the power storage device element 400, while the other end of the tab 300 protrudes outside from an edge of the housing 100.

The tab 300 is formed of a metal material, for example, aluminum, nickel, or copper. For example, when the power storage device element 400 is a lithium ion storage device, the tab 300 connected to the positive electrode is typically formed of aluminum or the like, and the tab 300 connected to the negative electrode is typically formed of copper, nickel, or the like.

The power storage device 10 includes two tabs 300. One of the tabs 300 is sandwiched between the packaging materials 110, 120 with the tab film 310 interposed therebetween, at an end in the direction of arrow L of the housing 100. The other tab 300 is sandwiched between the packaging materials 110, 120 with the tab film 310 interposed therebetween, at an end in the direction of arrow R of the housing 100.

The tab film 310 is an adhesive protective film, and is configured to adhere to both the packaging materials 110, 120, and the tab 300 (metal). The metallic tab 300 can be fixed between the packaging materials 110, 120, with the tab film 310 being interposed therebetween. Particularly for use at a high voltage, the tab film 310 preferably includes a heat-resistant layer or a heat-resistant component, and has a short-circuit preventing function.

The valve device 200 communicates with the inside of the housing 100, and is configured to, when the internal pressure of the housing 100 reaches a predetermined value or higher due to a gas generated in the housing 100, release the gas in the housing 100 to the outside. A casing of the valve device 200 is preferably formed of a material that directly adheres to the innermost layers of the packaging materials 110, 120, and is preferably formed of a resin having the same heat sealability as that of the innermost layers of the packaging materials 110, 120, for example, a resin, such as polypropylene (PP). If a different material other than PP is used for a reason such as heat resistance, it is effective to perform sealing with a heat-weldable film capable of adhering to both the different material and PP being interposed therebetween, as with the tab film used for the tabs. An end of the valve device 200 in the direction of arrow B is sandwiched between the packaging materials 110, 120, on an end of the housing 100 in the direction of arrow F. The valve device 200 will be described in detail later.

The power storage device 10 according to the first embodiment employs various structures devised for attachment of the valve device 200 to the housing 100. The following sequentially describes a structure of the housing 100, a structure of the valve device 200, an attached state of the valve device 200 to the housing 100, and a method for manufacturing the power storage device 10.

The directions indicated by the arrows L, R, U, D, F, and B are the same in all the drawings. Hereinafter, the direction of arrows LR is also referred to as the "width direction of the power storage device 10", and the direction of arrows UD is also referred to as the "thickness direction of the power storage device 10".

<1-2. Structure of the Housing>

Figure 3:
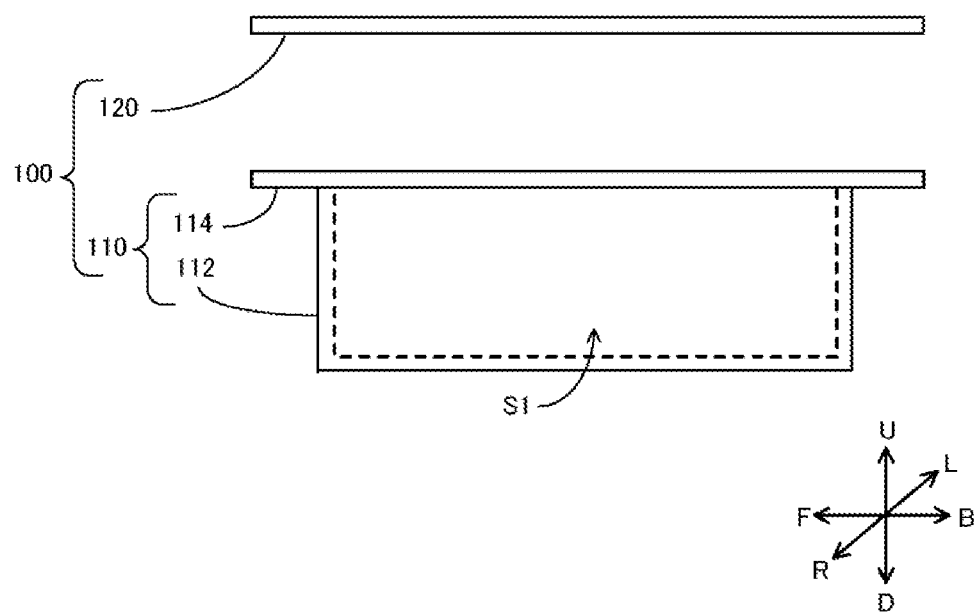
FIG. 3 is a diagram showing a housing.

FIG. 3 is a diagram showing the housing 100. As shown in FIG. 3, the housing 100 includes the packaging materials 110, 120. The packaging materials 110, 120 are each formed of a so-called laminated film, and have a substantially identical rectangular plan view shape.

The packaging material 110 includes a molded portion 112 molded to form a space S1, and a flange portion 114 that extends from the molded portion 112 in the direction of arrows FB and the direction of arrows LR. In the molded portion 112, a surface in the direction of arrow U is open. The power storage device element 400 (FIG. 1) is disposed in the space S1 through the open surface.

Figure 4:
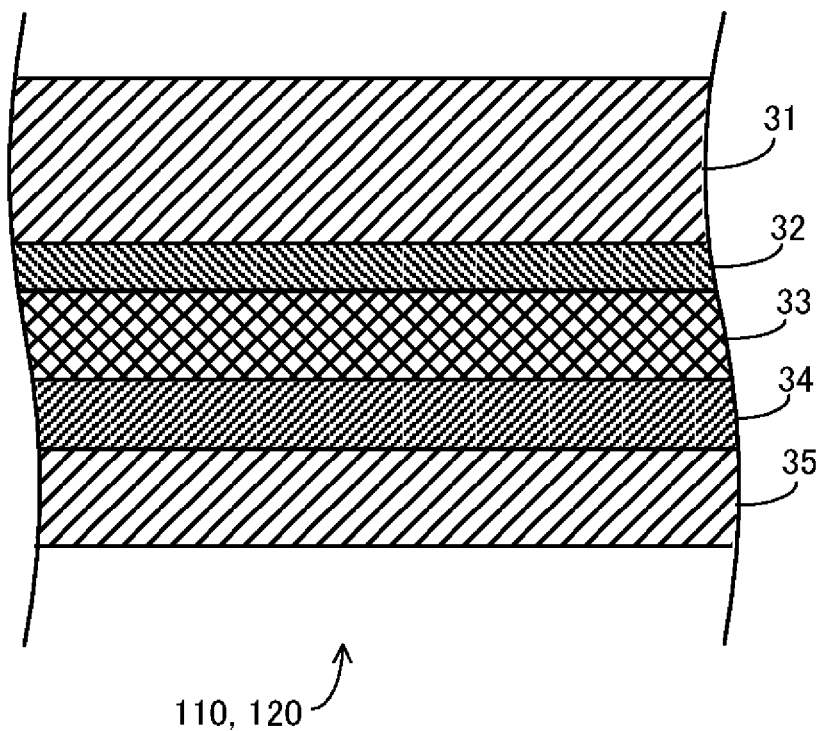
FIG. 4 is a diagram showing one exemplary cross-sectional structure of a packaging material.

FIG. 4 is a diagram showing one exemplary cross-sectional structure of the packaging materials 110, 120. As shown in FIG. 4, each of the packaging materials 110, 120 is a laminate in which a base material layer 31, an adhesive agent layer 32, a barrier layer 33, an adhesive layer 34, and a heat-sealable resin layer 35 are laminated in this order. Each of the packaging materials 110, 120 may not necessarily include the layers shown in FIG. 4, as long as the packaging materials 110, 120 include at least the base material layer 31, the barrier layer 33, and the heat-sealable resin layer 35 in this order.

In the housing 100, the base material layer 31 is the outermost layer, and the heat-sealable resin layer 35 is the innermost layer. During assembly of the power storage device 10, the heat-sealable resin layers 35 positioned on the respective peripheries of the packaging materials 110, 120 are heat-sealed, with the power storage device element 400 (FIG. 2) being disposed in the space S1 (FIG. 3), such that the peripheral bonded portion 130 is formed, the power storage device element 400 is hermetically sealed in the housing 100, the valve device 200 is fused and fixed to the peripheral bonded portion 130, and the tab 300 is also fused and fixed to the peripheral bonded portion 130 with the tab film 310 interposed therebetween. The layers included in the packaging materials 110, 120 will be hereinafter described. The thickness of the packaging materials 110, 120 is, for example, about 50 to 200 μm, and preferably about 90 to 150 μm.

(1-2-1. Base Material Layer)

The base material layer 31 is a layer that functions as the base material of the packaging materials 110, 120, and forms the outermost layer side of the housing 100.

The material that forms the base material layer 31 is not limited as long as it has insulation properties. Examples of the material that forms the base material layer 31 include polyesters, polyamides, epoxy, acrylic, fluororesins, polyurethanes, silicone resins, phenol, polyetherimides, polyimides, polycarbonates, and mixtures or copolymers thereof. For example, the base material layer 31 may be a resin film formed of any of the above-described resins, or may be formed by applying any of the above-described resins. The resin film may be an unstretched film or a stretched film. The stretched film may be, for example, a uniaxially stretched film or a biaxially stretched film, and is preferably a biaxially stretched film. Examples of stretching methods for forming a biaxially stretched film include a sequential biaxial stretching method, an inflation method, and a simultaneous biaxial stretching method. The base material layer 31 may be a single layer, or may be composed of two or more layers. When the base material layer 31 is composed of two or more layers, it may be a laminate in which resin films are laminated with an adhesive or the like, or may be a laminate of two or more resin films formed by co-extruding resins. The laminate of two or more resin films formed by co-extruding resins may be used, without being stretched, as the base material layer 31, or may be uniaxially or biaxially stretched and used as the base material layer 31. Specific examples of the base material layer 31 formed of the laminate of two or more resin films include a laminate of a polyester film and a nylon film, a laminate of two or more nylon films, and a laminate of two or more polyester films. Preferred are a laminate of a stretched nylon film and a stretched polyester film, a laminate of two or more stretched nylon films, and a laminate of two or more stretched polyester films. For example, when the base material layer 31 is the laminate of two or more resin films, it is preferably a laminate of a polyester resin film and a polyester resin film, a laminate of a polyamide resin film and a polyamide resin film, or a laminate of a polyester resin film and a polyamide resin film, and is more preferably a laminate of a polyethylene terephthalate film and a polyethylene terephthalate film, a laminate of a nylon film and a nylon film, or a laminate of a polyethylene terephthalate film and a nylon film. The polyester resin is preferably positioned as the outermost layer of the base material layer 31.

The thickness of the base material layer 31 is, for example, about 3 to 50 μm, and preferably about 10 to 35 μm.

(1-2-2. Adhesive Agent Layer)

The adhesive agent layer 32 is a layer that is optionally disposed on the base material layer 31, in order to impart adhesion to the base material layer 31. That is, the adhesive agent layer 32 is optionally provided between the base material layer 31 and the barrier layer 33.

The adhesive agent layer 32 is formed of an adhesive capable of bonding the base material layer 31 and the barrier layer 33. The adhesive to be used for forming the adhesive agent layer 32 may be a two-liquid curable adhesive, or may be a one-liquid curable adhesive. The adhesion mechanism of the adhesive used for forming the adhesive agent layer 32 is not limited, and may be any of a chemical reaction type, a solvent volatilization type, a heat melting type, a heat pressing type, and the like.

The thickness of the adhesive agent layer 32 is, for example, about 1 to 10 μm, and preferably about 2 to 5 μm.

(1-2-3. Barrier Layer)

The barrier layer 33 is a layer that functions to improve the strength of the packaging materials 110, 120, and prevent the intrusion of water vapor, oxygen, light, and the like into the power storage device 10. Examples of metals that form the barrier layer 33 include aluminum, stainless steel, and titanium, and aluminum is preferred. The barrier layer 33 may be formed of, for example, a metal foil or a vapor-deposited metal film, a vapor-deposited inorganic oxide film, a vapor-deposited carbon-containing inorganic oxide film, or a film provided with any of these vapor-deposited films. The barrier layer 33 is preferably formed of a metal foil, and more preferably formed of an aluminum foil. From the viewpoint of preventing the generation of creases and pinholes in the barrier layer 33 during the manufacture of each packaging material, the barrier layer is even more preferably formed of a soft aluminum foil, for example, annealed aluminum (JIS H4160: 1994 A8021 H-O, JIS H4160: 1994 A8079 H-O, JIS H4000: 2014 A8021 P-O, and JIS H4000: 2014 A8079 P-O).

While the thickness of the barrier layer 33 is not limited as long as it functions as a barrier layer against water vapor and the like, it is, for example, about 10 to 100 μm, and more preferably about 20 to 80 μm.

(1-2-4. Adhesive Layer)

The adhesive layer 34 is a layer that is optionally provided between the barrier layer 33 and the heat-sealable resin layer 35, in order to firmly bond the heat-sealable resin layer 35.

The adhesive layer 34 is formed of an adhesive capable of bonding the barrier layer 33 and the heat-sealable resin layer 35. While the composition of the adhesive used for forming the adhesive layer 34 is not limited, it is, for example, a resin composition containing an acid-modified polyolefin. While the acid-modified polyolefin is not limited as long as it is a polyolefin modified with an acid, it is preferably a polyolefin grafted with an unsaturated carboxylic acid or an anhydride thereof.

The thickness of the adhesive layer 34 is, for example, about 1 to 50 μm, and preferably about 2 to 40 μm.

(1-2-5. Heat-Sealable Resin Layer)

The heat-sealable resin layer 35 forms the innermost layer of the housing 100. The heat-sealable resin layer 35 is heat-sealed to the opposing heat-sealable resin layer on the periphery of the housing 100, such that the power storage device element 400 is hermetically sealed in the housing 100. Moreover, the heat-sealable resin covers the barrier layer at a certain film thickness of more to allow insulation between an electrolytic solution and the barrier layer metal to be maintained.

While the resin component to be used for the heat-sealable resin layer 35 is not limited as long as it is heat-sealable, examples thereof include polyolefins and acid-modified polyolefins.

Examples of polyolefins include polyethylene, such as low-density polyethylene, medium-density polyethylene, high-density polyethylene, and linear low-density polyethylene; crystalline or amorphous polypropylene, such as homopolypropylene, block copolymers of polypropylene (for example, block copolymers of propylene and ethylene), and random copolymers of polypropylene (for example, random copolymers of propylene and ethylene); and ter-polymers of ethylene-butene-propylene. Among these poly-olefins, polyethylene and polypropylene are preferred. While the acid-modified polyolefin is not limited as long as it is a polyolefin modified with an acid, it is preferably a polyolefin grafted with an unsaturated carboxylic acid or an anhydride thereof.

While the thickness of the heat-sealable resin layer 35 is not limited, it is preferably about 100 μm or less, more preferably about 15 to 90 μm, and still more preferably about 30 to 80 μm.

<1-3. Structure of the Valve Device>

Figure 5:
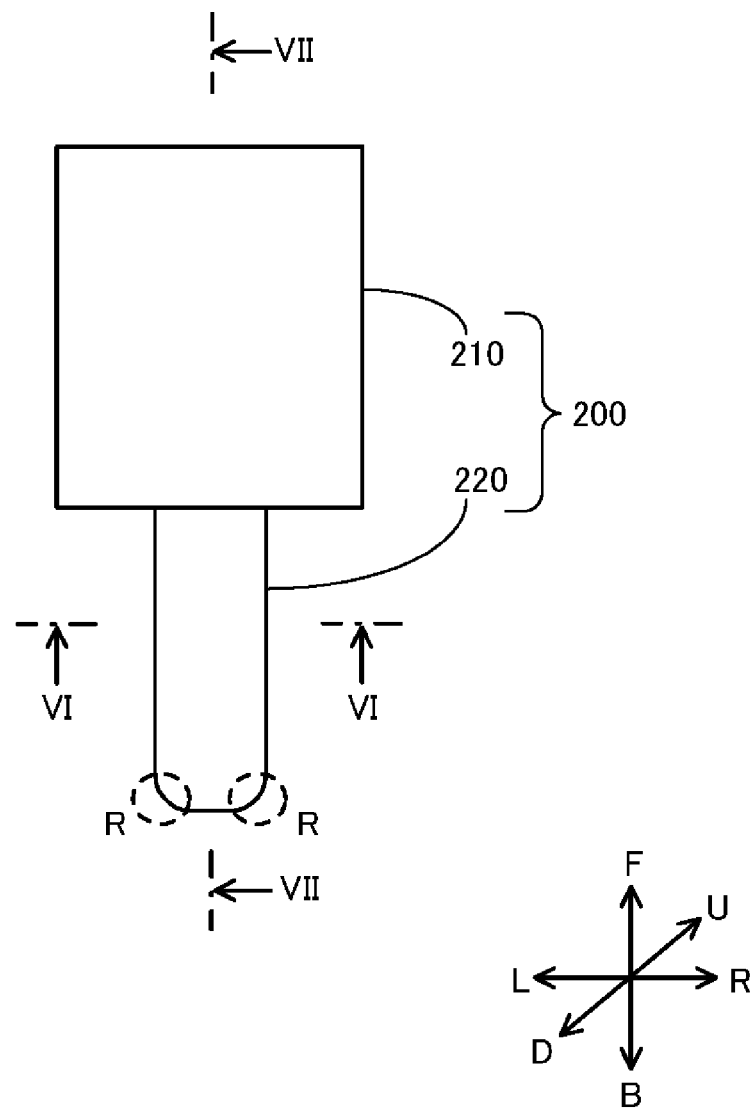
FIG. 5 is a plan view of a valve device according to the first embodiment.

FIG. 5 is a plan view of the valve device 200. As shown in FIG. 5, the valve device 200 includes a valve function portion 210 and a seal attachment portion 220. As will be described in detail below, the seal attachment portion 220 is a portion that is at least partially sandwiched and fixed between the packaging materials 110, 120 (FIG. 2). In the seal attachment portion 220, the outer circumferential surface of the seal attachment portion 220 and the heat-sealable resin layers 35, i.e., the innermost layers of the packaging materials 110, 120, are fused and bonded upon heat-sealing.

In the seal attachment portion 220, R is formed at the corners of the end in the direction of arrow B. That is, in the seal attachment portion 220, R (for example, R=0.2 to 2.0 mm) is formed at the corners in plan view of the end opposite to the valve function portion 210. In the present disclosure, the phrase "R is formed" indicates that a corner is rounded. The phrase "R is formed" herein structurally means that a corner is rounded in the same manner as being chamfered. When "R" is used alone, it means the radius of the rounded corner. While it is possible to round a corner (form R) by chamfering a sharp corner formed in the manufacturing process of the valve device 200, when the casing of the valve device 200 is a resin molded article, it is also possible to form R by molding the resin to originally have a rounded corner, without chamfering such as cutting.

Figure 6:
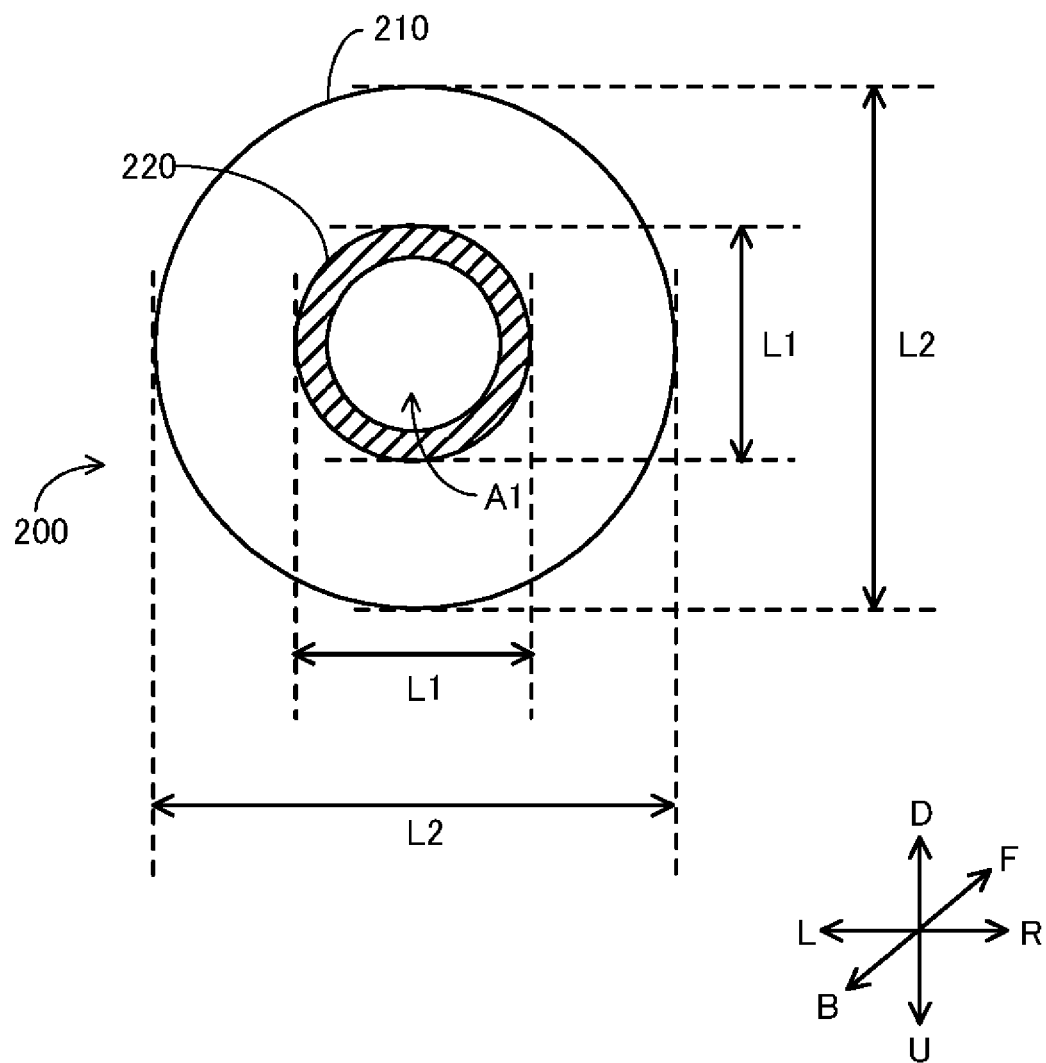
FIG. 6 is a cross-sectional view along VI-VI in FIG. 5.

FIG. 6 is a cross-sectional view along VI-VI in FIG. 5. As shown in FIG. 6, in the valve device 200, each of the valve function portion 210 and the seal attachment portion 220 has a perfectly circular cross section, and a vent passage A1 is formed inside the seal attachment portion 220. The vent passage A1 has a perfectly circular cross section.

In the valve device 200, the valve function portion 210 has a length L2 in the thickness direction (direction of arrows UD) of the power storage device 10 that is greater than a length L1 of the seal attachment portion 220 in the thickness direction of the power storage device 10. The valve function portion 210 has a length L2 in the width direction (direction of arrows LR) of the power storage device 10 that is greater than a length L1 of the seal attachment portion 220 in the width direction of the power storage device 10. That is, the valve function portion 210 has a cross-sectional diameter greater than a cross-sectional diameter of the seal attachment portion 220. As a result, a step is formed at a boundary between the valve function portion 210 and the seal attachment portion 220 (FIG. 5).

Figure 7:
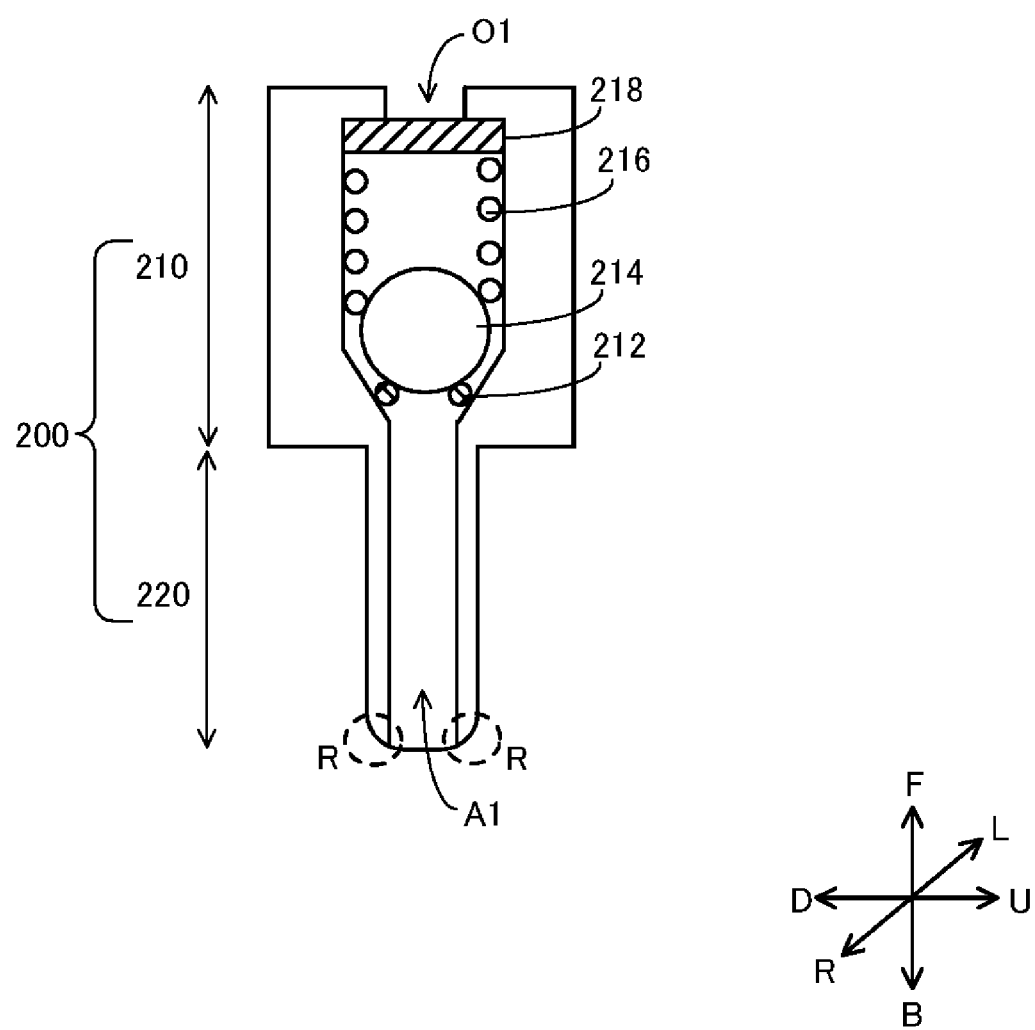
FIG. 7 is a cross-sectional view along VII-VII in FIG. 5.

FIG. 7 is a cross-sectional view along VII-VII in FIG. 5. As shown in FIG. 7, R (for example, R=0.2 to 2.0 mm) is formed on the end in the direction of arrow B of the seal attachment portion 220. The vent passage A1 is formed inside the seal attachment portion 220. The vent passage A1 guides, for example, a gas generated in the housing 100 to the valve function portion 210.

Inside the valve function portion 210, a valve mechanism configured to discharge a gas generated in the housing 100 (FIG. 1) is provided. Specifically, the valve function portion 210 includes a valve seat 212, a ball 214, a spring 216, and a membrane 218. That is, the valve function portion 210 is provided with a ball spring-type valve mechanism. The valve mechanism provided in the valve function portion 210 is not limited as long as it can reduce an increased internal pressure of the housing 100 due to a gas, and may, for example, be a poppet-type, duck bill-type, umbrella-type, diaphragm-type, or like valve mechanism. The valve seat 212 may be an O-ring, for example. Alternatively, the valve seat 212 may be a region that contacts the ball 214 in the casing portion of the valve function portion 210. When the casing portion of the valve function portion 210 is used as the valve seat 212, the casing portion of the valve function portion 210 and the valve seat 212 are integral with each other.

The valve seat is formed of an elastic body such as fluororubber, a metal such as stainless steel, or a resin. The surface of the valve seat may be coated with PTFE, perfluoroalkoxy fluororesin (PFA), or the like. The ball 214 may be formed of an elastic body such as fluororubber. While the hardness of the elastic body such as fluororubber is not limited, the lower limit is preferably about 30 or more, and more preferably about 50 or more, while the upper limit is preferably about 100 or less, and more preferably about 90 or less. Preferred ranges include from about 30 to 100; from about 30 to 90; from about 50 to 100; and from about 50 to 90. The hardness of the elastic body represents the hardness measured with a type A durometer as defined in JIS K 6253-3. Alternatively, the ball 214 may be formed of a metal such as stainless steel or a resin such as PTFE. As described above, when an elastic body is used as one of the ball 214 and the valve seat of the valve mechanism, and a member having a high hardness, such as a metal, is used as the other, the amount of helium leakage can be readily set in the range of $5.0 \times 10^{-11}$ Pa·m$^3$/sec or more and $5.0 \times 10^{-6}$ Pa·m$^3$/sec or less. Also when a combination of different metals is used for the valve seat and the ball, the amount of helium leakage can be readily set in the above-described range. However, as described above, in order to set the amount of helium leakage in the range of about $5.0 \times 10^{-11}$ Pa·m$^3$/sec to $2.0 \times 10^{-10}$ Pa·m$^3$/sec, or even in the range of about $5.0 \times 10^{-11}$ Pa·m$^3$/sec to $1.5 \times 10^{-10}$ Pa·m$^3$/sec, the shape of the region where the valve seat and the ball of the valve mechanism are in contact with each other needs to be designed and processed with extremely high precision, at a high level heretofore unattained in conventional check valves. In order for the shape of the region where the valve seat and the ball of the valve mechanism are in contact with each other to be designed and processed with extremely high precision, it is particularly preferred that both the valve seat and the ball be formed of stainless steel. The spring 216 is formed of stainless steel, for example. The membrane 218 is formed of a PTFE membrane that has a pore diameter of about $10^{-2}$ to $10^{0}$ μm, and allows only a gas to permeate (permselective), while preventing the electrolytic solution from leaking. PTFE refers to polytetrafluoroethylene. Since a PTFE membrane is a soft material, if the strength is insufficient, a PTFE membrane reinforced by being integrally molded with a mesh or a nonwoven fabric, such as polypropylene or polyester, may be used. While FIG. 7 and the like, for example, show the membrane 218 as being provided in the valve function portion 210, it is preferred that the membrane 218 be provided in the seal attachment portion 220 (for example, the vent passage A1), from the viewpoint of preventing the intrusion of a liquid (for example, the electrolytic solution) into the valve function portion 210. If the electrolytic solution or the like adheres to the valve function portion 210, the valve function may be hindered by the crystalline component of the electrolytic solution, for example. The shape of the ball may be spherical, for example, although the shape may not necessarily be spherical, as long as it corresponds to the shape of the region where the ball and the valve seat contact each other. The shape of the ball may be, for example, hemispherical, prolate, or oblate. For example, when the ball is hemispherical, a columnar member may extend from the flat surface.

When the internal pressure of the housing 100 to which the valve device 200 is attached reaches a predetermined pressure, the gas guided through the vent passage A1 presses the ball 214 in the direction of arrow F. When the ball 214 is pressed and the spring 216 is contracted, the gas in the housing 100 passes through a gap formed between the ball 214 and the valve seat 212, permeates through the membrane 218, and is discharged outside the housing 100 through an outlet O1.

<1-4. Attached State of the Valve Device>

Figure 8:
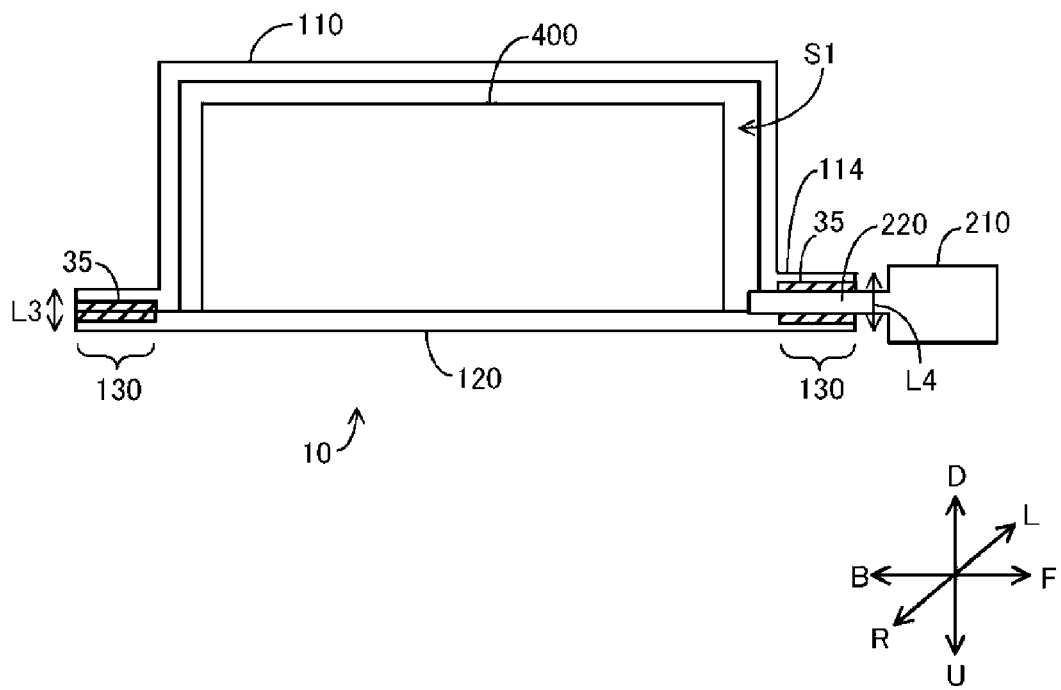
FIG. 8 is a cross-sectional view along VIII-VIII in FIG. 1, for explaining an attached state of the valve device.

FIG. 8 is a cross-sectional view along VIII-VIII in FIG. 1, for explaining an attached state of the valve device 200. As shown in FIG. 8, the valve function portion 210 of the valve device 200 is positioned outside an edge of the peripheral bonded portion 130. On the other hand, a portion of the seal attachment portion 220 of the valve device 200 is sandwiched between the heat-sealable resin layer 35 of the packaging material 110 and the heat-sealable resin layer 35 of the packaging material 120 in the peripheral bonded portion 130. In the portion of the seal attachment portion 220, the outer circumferential surface of the seal attachment portion 220 and the heat-sealable resin layers 35, i.e., the innermost layers of the packaging materials 110, 120, are fused and bonded. For convenience sake, FIG. 8 partially shows the heat-sealable resin layers 35 only near the peripheral bonded portion 130, for explaining that the valve device 200 is fused and bonded to the heat-sealable resin layers 35, i.e., the innermost layers of the packaging materials 110, 120; however, the heat-sealable resin layers 35 are formed on the entire surfaces of the packaging materials 110, 120.

In the power storage device 10 according to the first embodiment, the seal attachment portion 220 is sandwiched between the heat-sealable resin layers 35 in the peripheral bonded portion 130, while the valve function portion 210 is not sandwiched between the heat-sealable resin layers 35 in the peripheral bonded portion 130. The reason for this is now described.

Suppose that the valve function portion 210 is sandwiched between the heat-sealable resin layers 35 in the peripheral bonded portion 130. In this case, during fusion (heat-sealing) of the heat-sealable resin layers 35 on the peripheries of the packaging materials 110, 120, there is the possibility that the valve mechanism in the valve function portion 210 fails due to the applied heat and pressure.

In the power storage device 10 according to the first embodiment, it is the seal attachment portion 220, not the valve function portion 210, that is sandwiched between the heat-sealable resin layers 35 in the peripheral bonded portion 13. Therefore, in the power storage device 10, during the heat-sealing, the valve function portion 210 is not subjected to the application of high pressure and heat. That is, in the power storage device 10, because the valve function portion 210 is not sandwiched between the heat-sealable resin layers 35, a failure of the valve mechanism due to the pressure and heat applied during the heat-sealing is prevented.

Moreover, in the power storage device 10 according to the first embodiment, the cross-sectional diameter of the seal attachment portion 220 is smaller than the cross-sectional diameter of the valve function portion 210, as described above. Therefore, the difference between a length L4 in the thickness direction of the power storage device in the region of the peripheral bonded portion 130 where the seal attachment portion 220 is sandwiched and a length L3 in the thickness direction of the power storage device in the region of the peripheral bonded portion 130 where the seal attachment portion 220 is not sandwiched is small, compared to when the cross-sectional diameter of the seal attachment portion 220 is equal to or more than the cross-sectional diameter of the valve function portion 210. As this difference increases, the heat-sealing pressure needs to be increased to achieve a state in which the outer circumferential surface of the seal attachment portion 220 is fused and gaplessly bonded to the heat-sealable resin layers 35, i.e., the innermost layers of the packaging materials 110, 120. As a result, the pressure applied to the periphery of the housing 100 for the heat-sealing increases. As the pressure increases, the heat-sealable resin layers 35 are more likely to be thinned particularly in the position where the seal attachment portion 220 is sandwiched, and also in the position where the tab film 310 and the tab 300 are sandwiched. As the heat-sealable resin layers 35 become thinner, it is more likely that dielectric breakdown occurs in the power storage device 10.

In the power storage device 10 according to the first embodiment, the difference between the length L4 and the length L3 is small, as described above. Therefore, when the periphery of the housing 100 is sandwiched by a heat-sealing machine, an appropriate amount of pressure and heat are applied to the heat-sealable resin layers 35 throughout the periphery of the housing 100. As a result, in the power storage device 10, the possibility that dielectric breakdown occurs in the power storage device 10 can be reduced, and simultaneously, the opposing heat-sealable resin layers 35 can be properly fused to allow the seal attachment portion 220 to be firmly fixed to the housing 100.

Moreover, in the power storage device 10 according to the first embodiment, the end in the direction of arrow B of the seal attachment portion 220 protrudes farther into the space S1 than the flange portion 114. Therefore, depending on the use situation of the power storage device 10, the end in the direction of arrow B of the seal attachment portion 220 may contact the power storage device element 400. In the power storage device 10 according to the first embodiment, R is formed on the end in the direction of arrow B of the seal attachment portion 220 (FIG. 5), as described above. Therefore, even if the end of the seal attachment portion 220 contacts the power storage device element 400, the end is unlikely to damage the power storage device element 400. Moreover, depending on the use situation of the power storage device 10, the end in the direction of arrow B of the seal attachment portion 220 may contact the heat-sealable resin layer 35 of the packaging material 120. In the power storage device 10 according to the first embodiment, R is formed on the end in the direction of arrow B of the seal attachment portion 220, as described above, such that even if the end of the seal attachment portion 220 contacts the heat-sealable resin layer 35 of the packaging material 120, the end is unlikely to damage the heat-sealable resin layer 35.

<1-5. Manufacturing Method>

Figure 9:
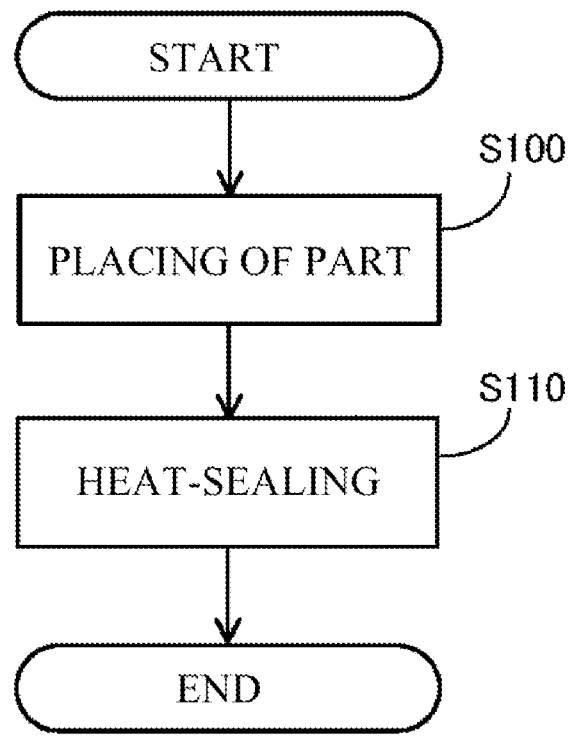
FIG. 9 is a flow chart showing a procedure of manufacturing the power storage device.

FIG. 9 is a flow chart showing a procedure of manufacturing the power storage device 10. The power storage device 10 is manufactured by a manufacturing apparatus, for example.

With reference to FIG. 9, the manufacturing apparatus places each part in the housing 100 (step S100). For example, the manufacturing apparatus places, in the space S1 inside the packaging material 110, the power storage device element 400 to which the tab 300 attached with the tab film 310 is electrically connected via welding, such that the tab 300 attached with the tab film 310 is placed on the flange portion 114 of the packaging material 110. Subsequently, the manufacturing apparatus places the valve device 200 on the flange portion 114 of the packaging material 110. Alternatively, the manufacturing apparatus may place the power storage device element 400 in the space S1 inside the packaging material 110, and subsequently weld and electrically connect the tab 300 attached with the tab film 310 to the power storage device element 400, such that the tab 300 attached with the tab film 310 is simultaneously placed on the flange portion 114 of the packaging material 110. Subsequently, the manufacturing apparatus may place the valve device 200 on the flange portion 114 of the packaging material 110. The manufacturing apparatus then places the packaging material 120 on the packaging material 110.

Figure 10:
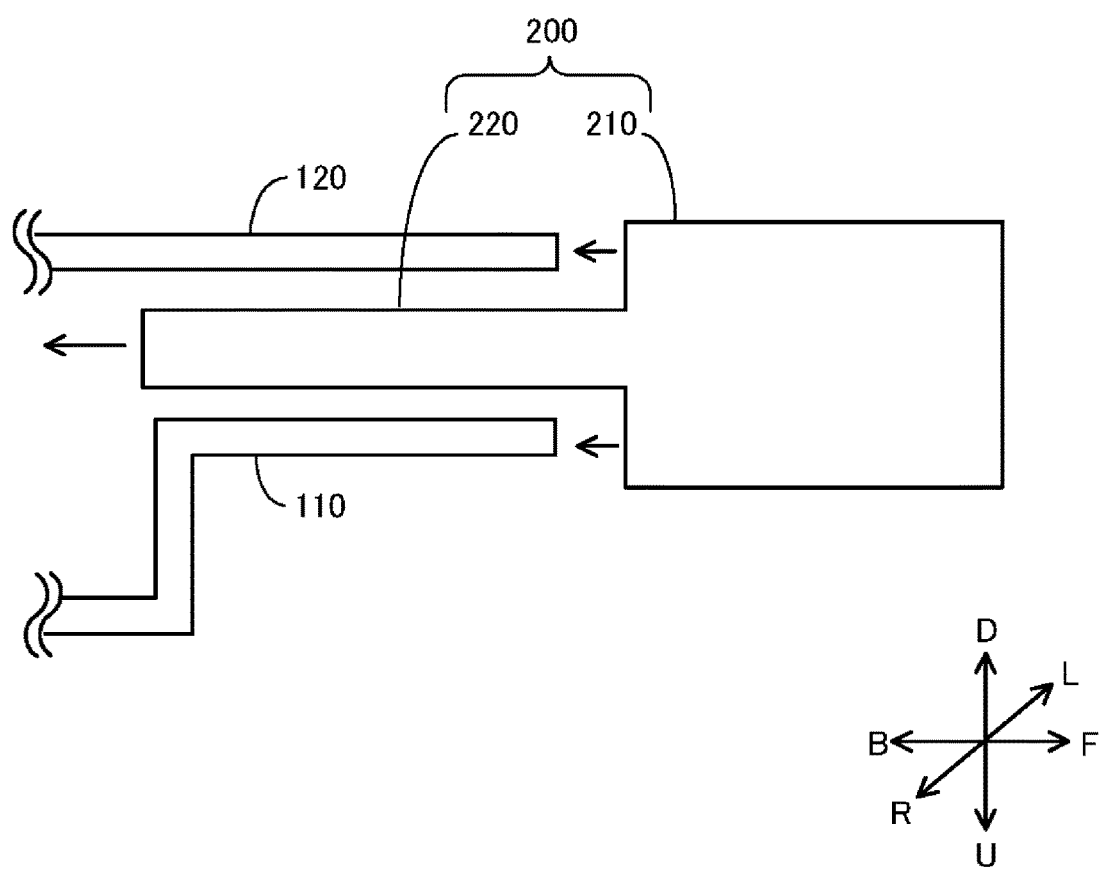
FIG. 10 is a diagram showing an operation of placing the valve device between the flange portion and the packaging material.
Figure 31:
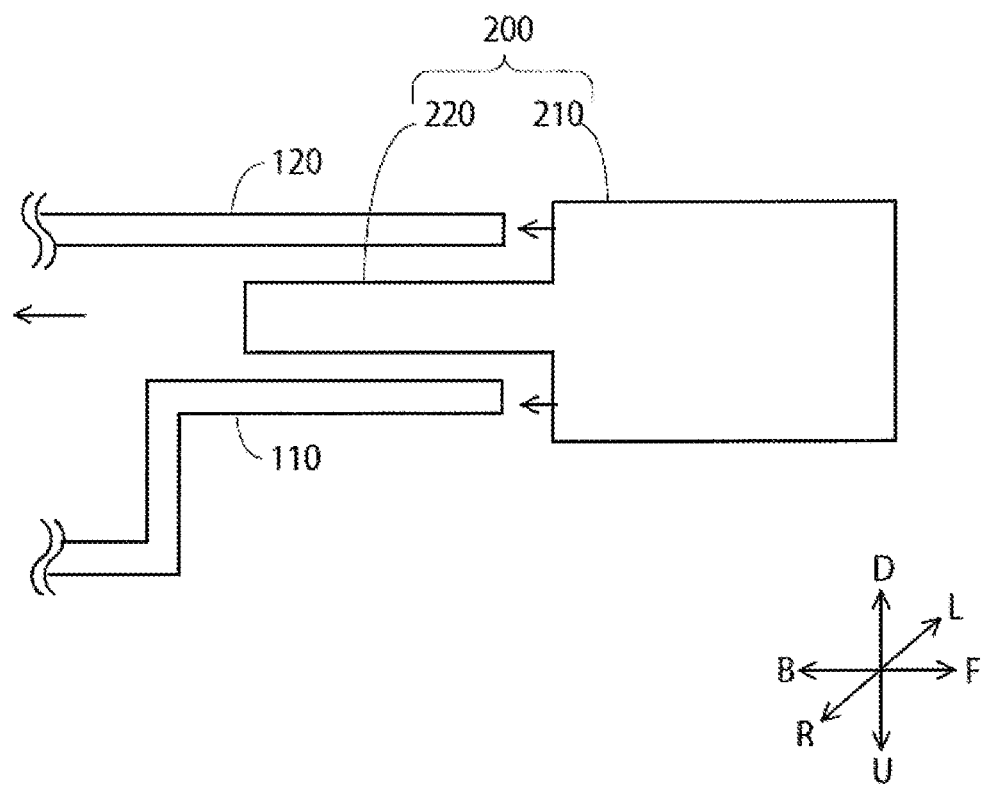
FIG. 31 is a diagram showing an operation of placing the valve device between the flange portion and the packaging material.

FIG. 10 is a diagram showing an operation of placing the valve device 200 between the flange portion 114 of the packaging material 110 and the packaging material 120. As shown in FIG. 10, a step is formed between the valve function portion 210 and the seal attachment portion 220. Therefore, during sandwiching of the seal attachment portion 220 between the packaging materials 110, 120, even if the valve device 200 is pushed too far into the housing 100, the step portion is caught by the ends of the packaging materials 110, 120. Therefore, in the power storage device 10, the valve function portion 210 can be prevented from being erroneously sandwiched between the packaging materials 110, 120 (heat-sealable resin layers 25), in the manufacturing process of the power storage device 10. Alternatively, as shown in FIG. 31, a leading end of the seal attachment portion 220 of the valve device 200 may be disposed in a position sandwiched between the packaging materials 110, 120.

Once the manufacturing apparatus has completed the placing of each part, it heat-seals the periphery of the housing 100 (step S110). That is, the manufacturing apparatus sandwiches the periphery of the housing 100, and applies pressure and heat to the periphery of the housing 100. This causes the opposing heat-sealable resin layers 35 to be fused together on the periphery of the housing 100, resulting in the formation of the peripheral bonded portion 130. Moreover, the power storage device element 400 is hermetically sealed in the housing 100, the valve device 200 is fused and fixed to the peripheral bonded portion 130, and the tab 300 is fused and fixed to the peripheral bonded portion 130 with the tab film 310 interposed therebetween. As a result, the power storage device 10 is completed. In the heat-sealing step, the inside of the housing 100 is degassed, such that any unwanted gas is not included in the housing 100. Specifically, the periphery is partially left unbonded without being bonded around the entire circumference, and the housing 100 is degassed through this unbonded periphery. Lastly, pressure and heat are applied to the unbonded periphery to complete the peripheral bonded portion 130 around the entire circumference. Alternatively, in some power storage devices for which electrolytic solutions are required, the periphery is partially left unbonded without being bonded around the entire circumference, and an electrolytic solution is injected through this unbonded periphery, and the housing 100 is degassed through this unbonded periphery. Lastly, pressure and heat are applied to the unbonded periphery to complete the peripheral bonded portion 130 around the entire circumference.

It is also effective to form the surfaces of the sealing bars of the manufacturing apparatus that sandwich the periphery of the housing 100 to have a shape that conforms to the outer shape of the seal attachment portion 220. This results in firmer adhesion between the heat-sealable resin layers 35 in the position where the seal attachment portion 220 is sandwiched. In this case also, it is effective to form the seal attachment portion 220 to have a flat shape, as in the below-described second embodiment, in order to reduce the load and deformation of the packaging materials 110, 120.

<1-6. Characteristics>

As described above, in the power storage device 10 according to the first embodiment, the seal attachment portion 220 of the valve device 200 is at least partially sandwiched between the heat-sealable resin layers 35 in the peripheral bonded portion 130, while the valve function portion 210 of the valve device 200 is not sandwiched between the heat-sealable resin layers 35 in the peripheral bonded portion 130. Therefore, in the power storage device 10, during fusion of the opposing heat-sealable resin layers 35, the valve function portion 210 is less subjected to the application of high pressure and heat than the seal attachment portion 220. As a result, in the power storage device 10, a failure of the valve mechanism in the valve function portion 210 due to the pressure and heat applied during fusion of the opposing heat-sealable resin layers 35 can be prevented.

The power storage device element 400 represents one example of the "power storage device element" of the present disclosure, the housing 100 represents one example of the "housing" of the present disclosure, and the valve device 200 represents one example of the "valve device" of the present disclosure. The base material layer 31 represents one example of the "base material layer" of the present disclosure, the barrier layer 33 represents one example of the "barrier layer" of the present disclosure, and the heat-sealable resin layers 35 represent one example of the "heat-sealable resin layer" of the present disclosure. The peripheral bonded portion 130 represents one example of the "peripheral bonded portion" of the present disclosure. The valve function portion 210 represents one example of the "first portion" of the present disclosure, and the seal attachment portion 220 represents one example of the "second portion" of the present disclosure. The vent passage A1 represents one example of the "vent passage" of the present disclosure.

For convenience sake, the power storage device element 400 is shown as being smaller in size than the space S1 of the housing 100 so that it can be easily understood that the power storage device element 400 is housed in the space S1 inside the housing 100. However, while the space S1 is slightly larger than the power storage device element 400 in order for the power storage device element 400 to be placed in the space S1 in the manufacturing process, the housing 100 is degassed in the manufacturing process, as described above, such that in the final power storage device 10, the space S1 has a slightly reduced size due to the degassing, which is substantially equal to the size of the power storage device element 400, and the power storage device element 400 is housed in the space S1 almost gaplessly.

2. Second Embodiment

In the second embodiment, the valve device has a structure different from that of the first embodiment described above. Otherwise, the second embodiment is basically the same in structure as the first embodiment. Elements different from the first embodiment are herein described.

Figure 11:
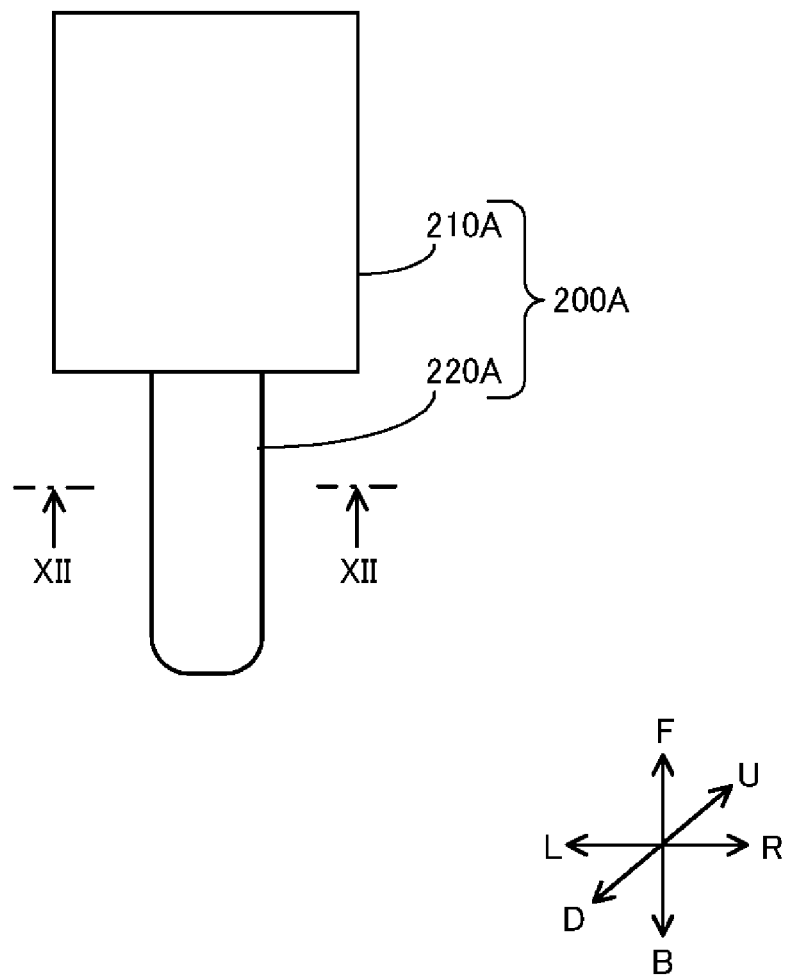
FIG. 11 is a plan view of a valve device according to a second embodiment.

FIG. 11 is a plan view of a valve device 200A installed in a power storage device according to the second embodiment. As shown in FIG. 11, the valve device 200A includes a valve function portion 210A and a seal attachment portion 220A. The seal attachment portion 220A is a portion that is at least partially sandwiched between the packaging materials 110, 120 and heat-sealed. The seal attachment portion 220A has a cross-sectional shape different from that of the first embodiment. The valve function portion 210A is basically the same as in the first embodiment, except that the shapes of the casing and the valve mechanism are partially modified according to the shape of a vent passage A6 (FIG. 12) formed in the seal attachment portion 220A.

Figure 12:
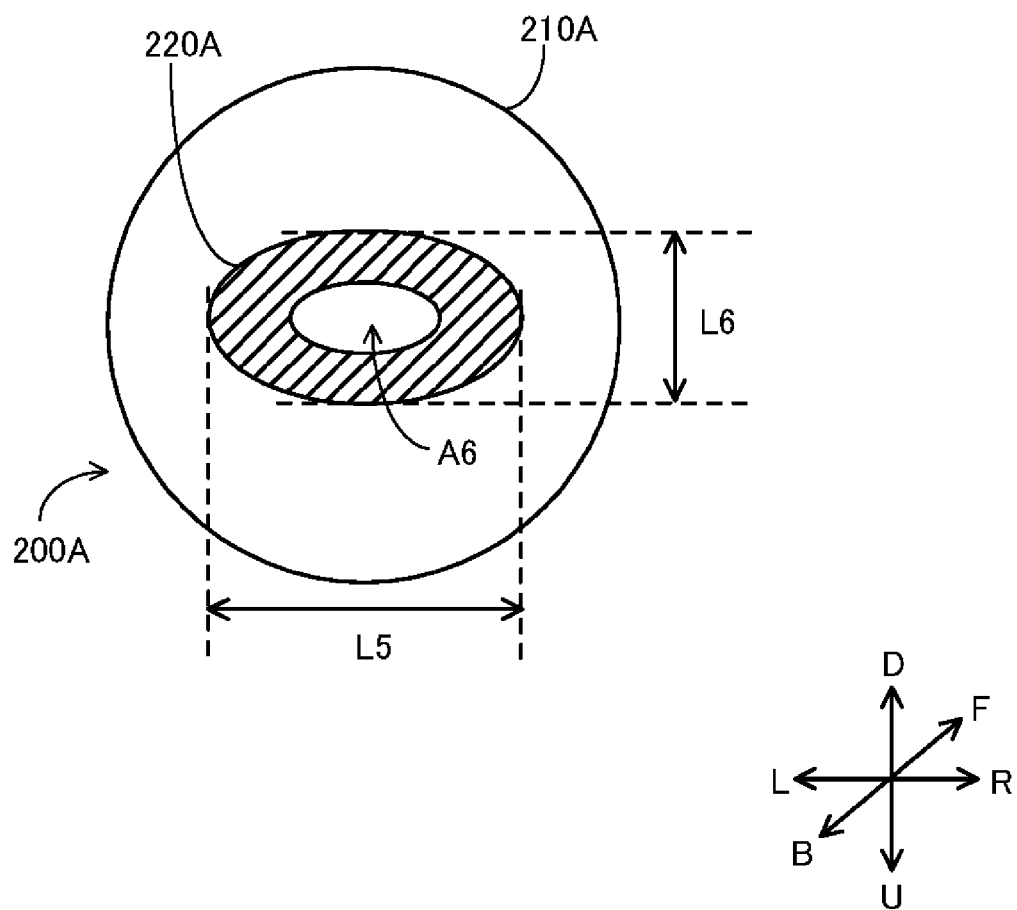
FIG. 12 is a cross-sectional view along XII-XII in FIG. 11.

FIG. 12 is a cross-sectional view along XII-XII in FIG. 11. As shown in FIG. 12, in the cross section of the seal attachment portion 220A, a length L5 in the width direction (direction of arrows LR) of the power storage device is greater than a length L6 in the thickness direction (direction of arrows LR) of the power storage device. More specifically, the seal attachment portion 220A has an elliptical cross-sectional shape.

The vent passage A6 is formed inside the seal attachment portion 220A. The vent passage A6 also has a length in the width direction of the power storage device that is greater than a length in the thickness direction of the power storage device. More specifically, the vent passage A6 has an elliptical cross-sectional shape.

In this manner, in the second embodiment, in the cross section of the seal attachment portion 220A, the length L5 in the width direction of the power storage device is greater than the length L6 in the thickness direction of the power storage device. That is, the length of the seal attachment portion 220A in the thickness direction of the power storage device is small, compared to when the seal attachment portion has a perfectly circular cross-sectional shape (with an identical area). In this power storage device, the difference between the length in the thickness direction of the power storage device in the region of the peripheral bonded portion 130 where the seal attachment portion 220A is sandwiched and the length in the thickness direction of the power storage device in the region of the peripheral bonded portion 130 where the seal attachment portion 220A is not sandwiched is small. Therefore, in this power storage device, an appropriate amount of pressure and heat can be applied to the heat-sealable resin layers 35 throughout the periphery of the housing 100, and the opposing heat-sealable resin layers 35 can be properly fused, such that the seal attachment portion 220A of the valve device 200A can be firmly fixed to the housing 100.

The valve device 200A represents one example of the "valve device" of the present disclosure, the valve function portion 210A represents one example of the "first portion" of the present disclosure, and the seal attachment portion 220A represents one example of the "second portion" of the present disclosure. The vent passage A6 represents one example of the "vent passage" of the present disclosure.

3. Third Embodiment

In the third embodiment, the valve device has a structure different from that of the first embodiment described above. Otherwise, the third embodiment is basically the same in structure as the first embodiment. Elements different from the first embodiment are herein described.

Figure 13:
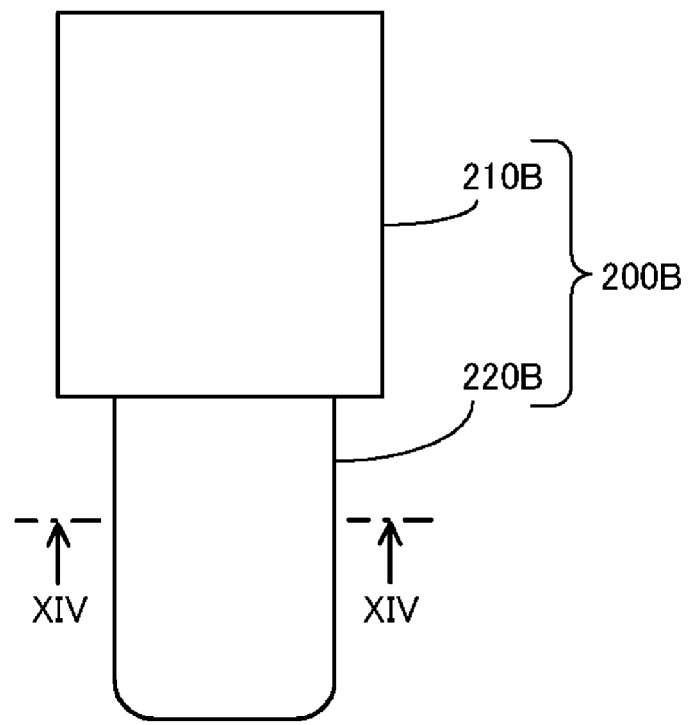
FIG. 13 is a plan view of a valve device according to a third embodiment.
Figure 13:
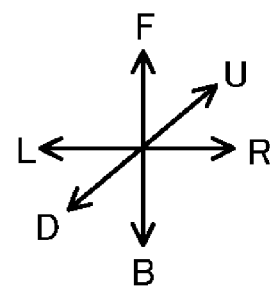

FIG. 13 is a plan view of a valve device 200B installed in a power storage device according to the third embodiment. As shown in FIG. 13, the valve device 200B includes a valve function portion 210B and a seal attachment portion 220B. The seal attachment portion 220B is a portion that is at least partially sandwiched between the packaging materials 110, 120 and heat-sealed. The seal attachment portion 220B has a cross-sectional shape different from that of the first embodiment. The valve function portion 210B is basically the same as in the first embodiment, except that the shapes of the casing and the valve mechanism are partially modified according to the shape of a vent passage A7 (FIG. 14) formed in the seal attachment portion 220B.

Figure 14:
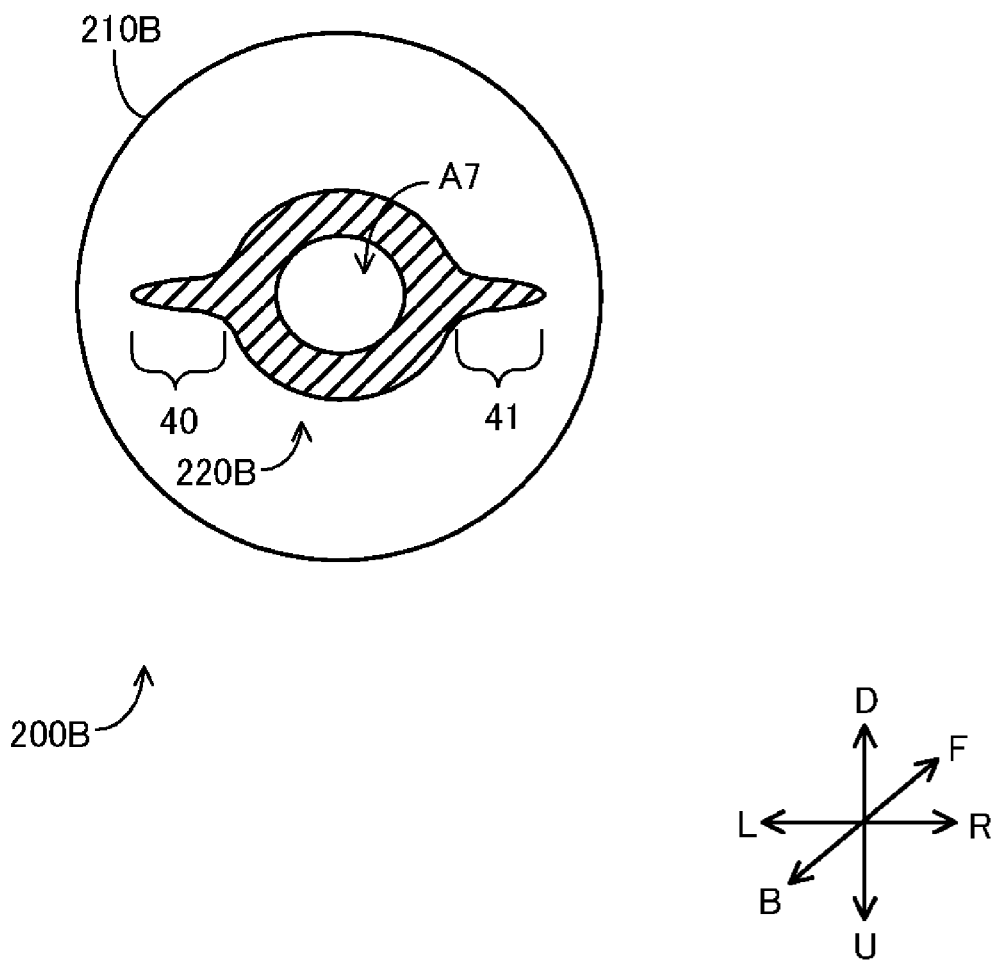
FIG. 14 is a cross-sectional view along XIV-XIV in FIG. 13.

FIG. 14 is a cross-sectional view along XIV-XIV in FIG. 13. As shown in FIG. 14, in the seal attachment portion 220B, wing-shaped extending ends 40, 41 are formed on both ends in the width direction (direction of arrows LR) of the power storage device. Each of the wing-shaped extending ends 40, 41 has a shape such that the thickness decreases toward the end in the width direction of the power storage device. From a different viewpoint, each of the wing-shaped extending ends 40, 41 is a portion having a gradual change in the length in the thickness direction of the power storage device, in the direction of arrows LR, compared to the other region (circular region) of the seal attachment portion 220B.

In the power storage device according to the third embodiment, the change in the thickness direction of the power storage device in a position of transition from the region of the peripheral bonded portion 130 where the seal attachment portion 220B is not sandwiched, to the region of the peripheral bonded portion 130 where the seal attachment portion 220B is sandwiched, is smooth, compared to the first embodiment (in which the seal attachment portion 220B is not provided with the wing-shaped extending ends 40, 41). Therefore, in this power storage device, there is no excessive force applied on the packaging materials 110, 120 at the boundary between the position where the seal attachment portion 220B is sandwiched between the heat-sealable resin layers 35 and the position where the seal attachment portion 220B is not sandwiched between the heat-sealable resin layers 35, such that the seal attachment portion 220B of the valve device 200B can be firmly fixed to the housing 100.

The valve device 200B represents one example of the "valve device" of the present disclosure, the valve function portion 210B represents one example of the "first portion" of the present disclosure, and the seal attachment portion 220B represents one example of the "second portion" of the present disclosure. The wing-shaped extending ends 40, 41 represent one example of the "wing-shaped extending end" of the present disclosure. The vent passage A7 represents one example of the "vent passage" of the present disclosure.

4. Fourth Embodiment

In the fourth embodiment, the valve device has a structure different from that of the first embodiment described above. Otherwise, the fourth embodiment is basically the same in structure as the first embodiment. Elements different from the first embodiment are herein described.

Figure 15:
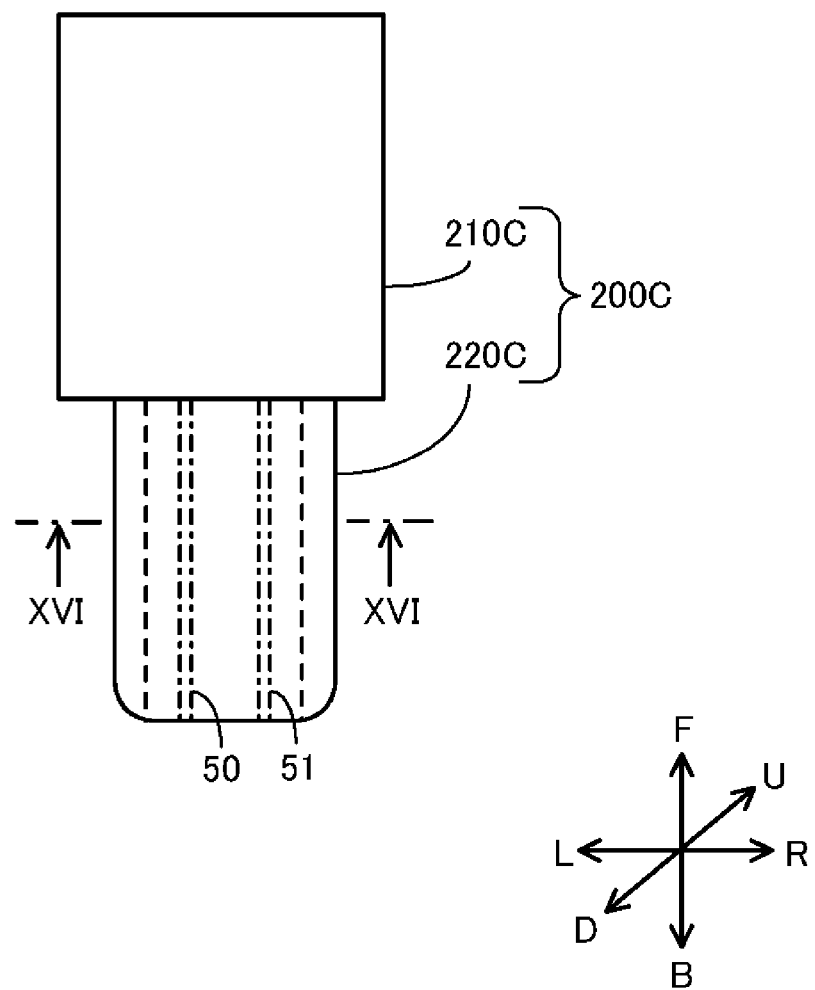
FIG. 15 is a plan view of a valve device according to a fourth embodiment.

FIG. 15 is a plan view of a valve device 200C installed in a power storage device according to the fourth embodiment. As shown in FIG. 15, the valve device 200C includes a valve function portion 210C and a seal attachment portion 220C. The seal attachment portion 220C is a portion that is at least partially sandwiched between the packaging materials 110, 120 and heat-sealed. The seal attachment portion 220C has a cross-sectional shape different from that of the first embodiment. The valve function portion 210C is basically the same as in the first embodiment, except that the shapes of the casing and the valve mechanism are partially modified according to the shape of a vent passage A2 (FIG. 16) formed in the seal attachment portion 220C.

Figure 16:
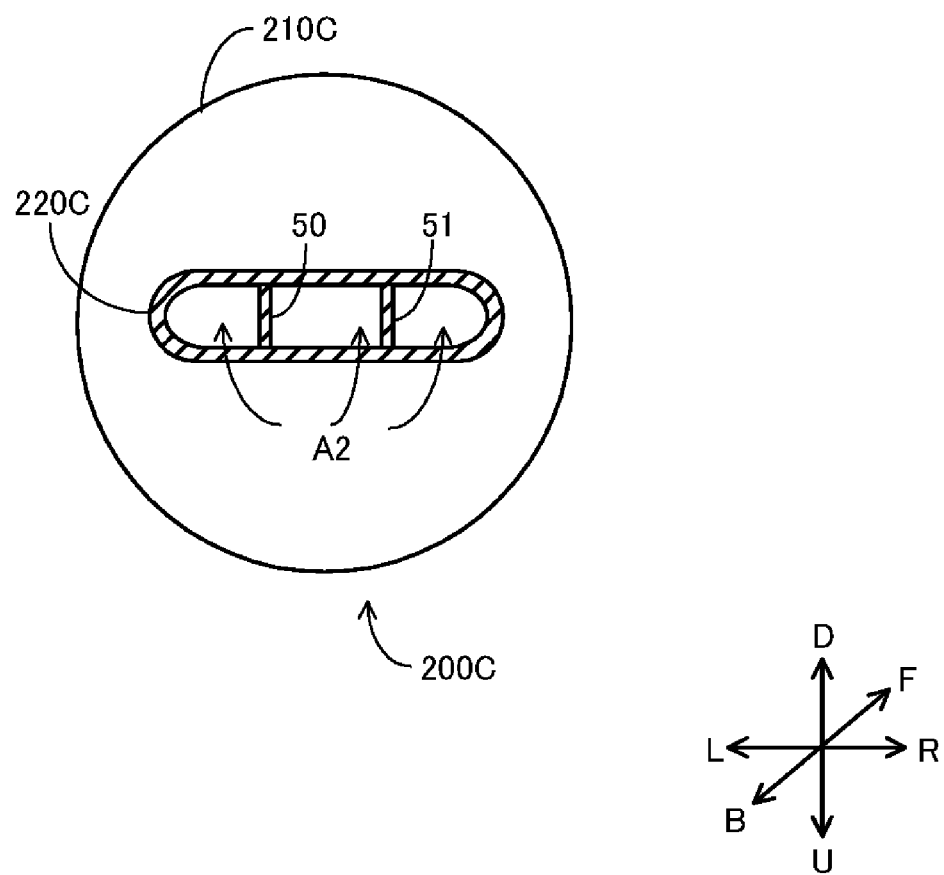
FIG. 16 is a cross-sectional view along XVI-XVI in FIG. 15.

FIG. 16 is a cross-sectional view along XVI-XVI in FIG. 15. As shown in FIG. 16, pillars 50, 51 are formed in the seal attachment portion 220C (in the vent passage A2). Each of the pillars 50, 51 extends in the thickness direction (direction of arrows UD) of the power storage device, and both ends in the thickness direction of the power storage device are connected to the inner circumference of the seal attachment portion 220C. Each of the pillars 50, 51 also extends in the direction of arrows FB in the vent passage A2 (FIG. 15). The number of the pillars may not necessarily be two, as long as it is at least one.

In the power storage device according to the fourth embodiment, because the pillars 50, 51 are formed in the vent passage A2, the vent passage A2 is maintained even if pressure and heat are applied to the seal attachment portion 220C sandwiched between the opposing heat-sealable resin layers 35. Therefore, in this power storage device, a failure of the vent passage A2 in the seal attachment portion 220C during fusion of the opposing heat-sealable resin layers 35 can be prevented.

The valve device 200C represents one example of the "valve device" of the present disclosure, the valve function portion 210C represents one example of the "first portion" of the present disclosure, and the seal attachment portion 220C represents one example of the "second portion" of the present disclosure. The pillars 50, 51 represent one example of the "pillar" of the present disclosure. The vent passage A2 represents one example of the "vent passage" of the present disclosure.

5. Fifth Embodiment

In the fifth embodiment, the valve device has a structure different from that of the first embodiment described above. Otherwise, the fifth embodiment is basically the same in structure as the first embodiment. Elements different from the first embodiment are herein described.

Figure 17:
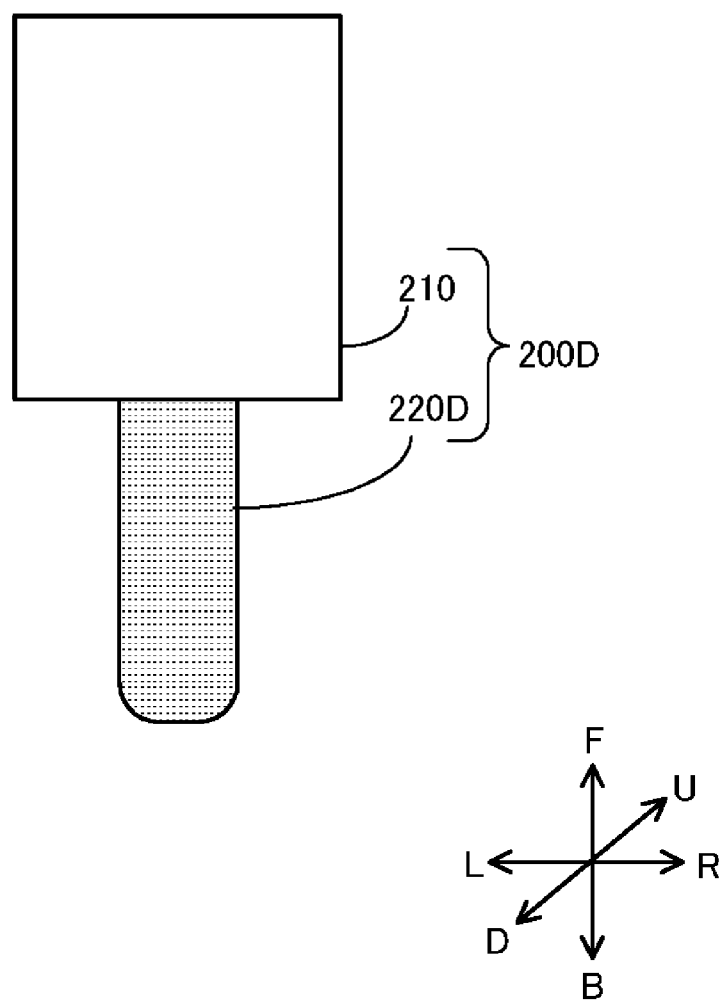
FIG. 17 is a plan view of a valve device according to a fifth embodiment.

FIG. 17 is a plan view of a valve device 200D installed in a power storage device according to the fifth embodiment. As shown in FIG. 17, the valve device 200D includes a valve function portion 210 and a seal attachment portion 220D. The valve function portion 210 is the same in structure as the first embodiment.

The seal attachment portion 220D is a portion that is at least partially sandwiched between the packaging materials 110, 120 and heat-sealed. The seal attachment portion 220D has an outer surface different from that of the first embodiment. Specifically, the outer surface of the seal attachment portion 220D has a satin finish surface. The satin finish surface has a surface roughness Ra of, for example, 1 to 20 μm.

In the power storage device according to the fifth embodiment, the outer surface of the seal attachment portion 220D has a satin finish surface, such that the heat-sealable resin is readily melted in an abutting position with the seal attachment portion 220D. Therefore, in this power storage device, the seal attachment portion 220D of the valve device 200D can be firmly fixed to the housing 100, compared to the first embodiment (in which the outer surface of the seal attachment portion 220D is smooth).

The valve device 200D represents one example of the "valve device" of the present disclosure, and the seal attachment portion 220D represents one example of the "second portion" of the present disclosure.

6. Sixth Embodiment

In the sixth embodiment, the valve device has a structure different from that of the first embodiment described above. Otherwise, the sixth embodiment is basically the same in structure as the first embodiment. Elements different from the first embodiment are herein described.

Figure 18:
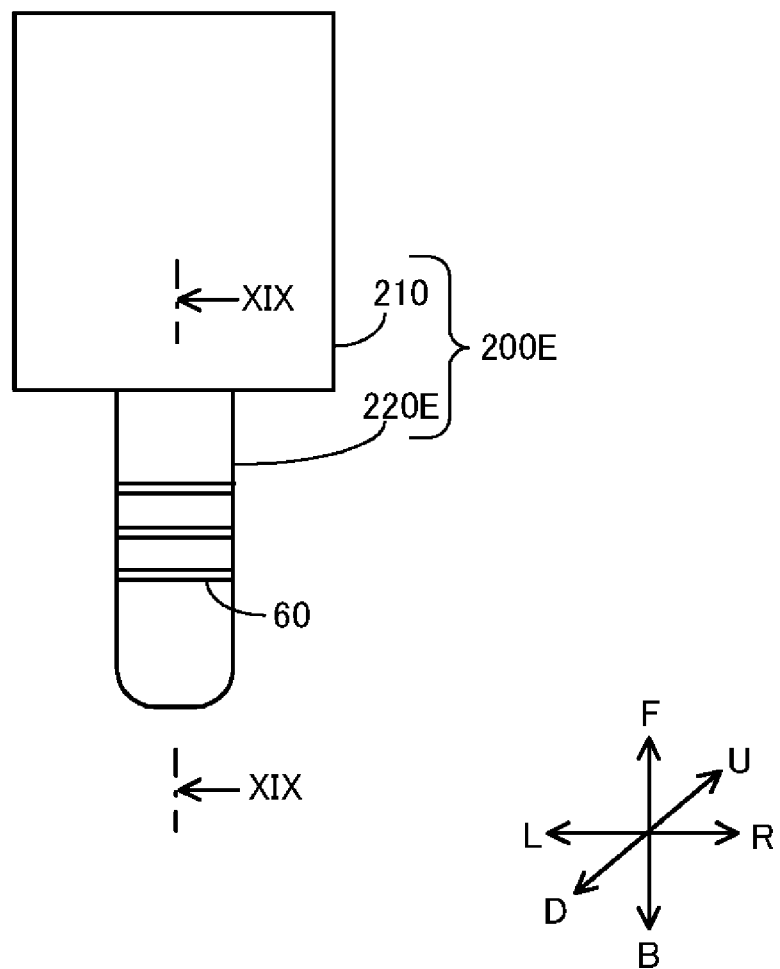
FIG. 18 is a plan view of a valve device according to a sixth embodiment.

FIG. 18 is a plan view of a valve device 200E installed in a power storage device according to the sixth embodiment. As shown in FIG. 18, the valve device 200E includes a valve function portion 210 and a seal attachment portion 220E. The valve function portion 210 is the same in structure as in the first embodiment.

The seal attachment portion 220E is a portion that is at least partially sandwiched between the packaging materials 110, 120 and heat-sealed. The seal attachment portion 220E has an outer surface different from that of the first embodiment. Specifically, ridge portions 60 are formed to continuously extend circumferentially around the outer surface of the seal attachment portion 220E. Three such ridge portions 60 are formed in the direction of arrows FB, on the seal attachment portion 220E. The number of the ridge portions 60 may not necessarily be three, as long as it is at least one.

Figure 19:
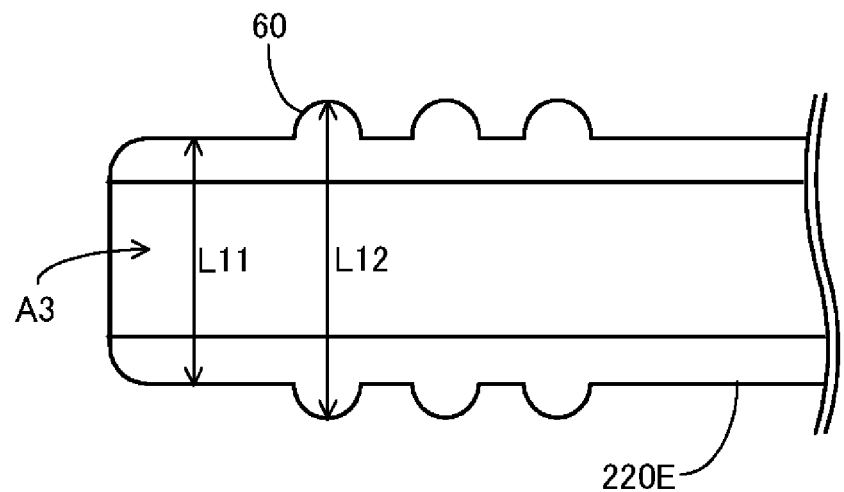
FIG. 19 is a cross-sectional view along XIX-XIX in FIG. 18.
Figure 19:
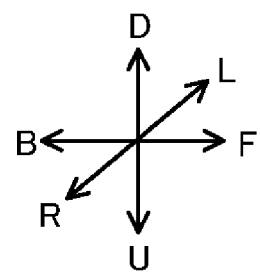

FIG. 19 is a cross-sectional view along XIX-XIX in FIG. 18. As shown in FIG. 19, the ridge portions 60 have a semi-circular cross section. The semi-circle has an R of, for example, 0.05 to 1.0 mm. In the seal attachment portion 220E, a diameter L12 (length in the thickness direction of the power storage device; length in the width direction of the power storage device) in the region where each ridge portion 60 is formed is greater than a diameter L11 in the region where the ridge portion 60 is not formed.

The ridge portions 60 reliably come into contact with the heat-sealable resin layers 35 during the heat-sealing, such that they can be readily fused to the packaging materials 110, 120. In the power storage device according to the sixth embodiment, the ridge portions 60 continuously extend circumferentially around the outer surface of the seal attachment portion 220E. Therefore, in this power storage device, the heat-sealable resin layers 35 and the seal attachment portion 220E can be fused circumferentially around the seal attachment portion 220E. Moreover, because the contact area between the outer surface of the seal attachment portion 220E and the heat-sealable resin is large, compared to the first embodiment (in which the ridge portions 60 are not formed on the seal attachment portion 220E), the seal attachment portion 220E of the valve device 200E can be firmly fixed to the packaging material 110.

The valve device 200E represents one example of the "valve device" of the present disclosure, and the seal attachment portion 220E represents one example of the "second portion" of the present disclosure. The ridge portions 60 represent one example of the "ridge portion" of the present disclosure. The vent passage A3 represents one example of the "vent passage" of the present disclosure.

While the ridge portions 60 continuously extend circumferentially in the sixth embodiment, the ridge portions 60 may not be formed around the entire circumference, or may not be continuous, as long as they extend circumferentially. For example, when the wing-shaped extending ends 40, 41 as described in the third embodiment above are provided, it is not required to provide a ridge portion 60 that extends around the circumference including the wing-shaped extending ends 40, 41. In such a case, a ridge portion 60 may not be provided on the tip portions of the wing-shaped extending ends 40, 41, or a ridge portion 60 may not be provided on the wing-shaped extending ends 40, 41; alternatively, a ridge portion 60 may be discontinuously formed circumferentially.

7. Seventh Embodiment

In the seventh embodiment, the valve device has a structure different from that of the first embodiment described above. Otherwise, the seventh embodiment is basically the same in structure as the first embodiment. Elements different from the first embodiment are herein described.

Figure 20:
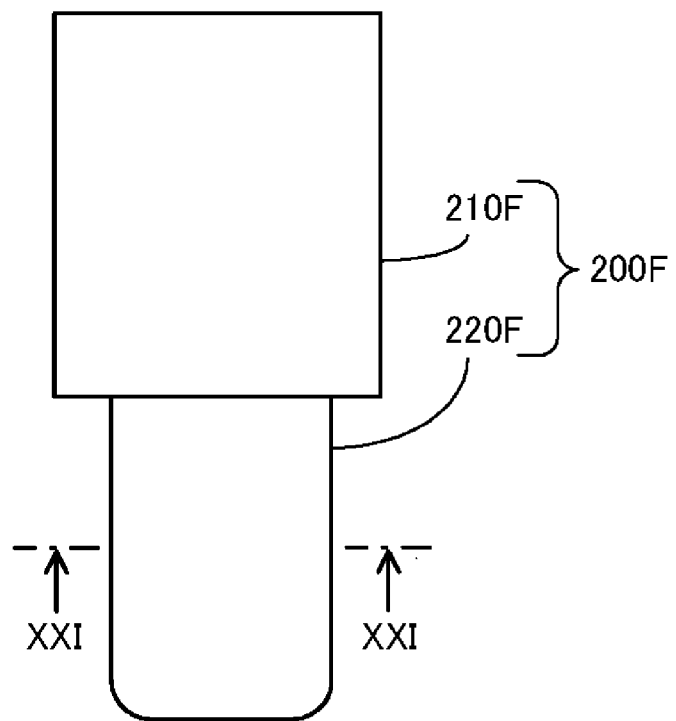
FIG. 20 is a plan view of a valve device according to a seventh embodiment.
Figure 20:
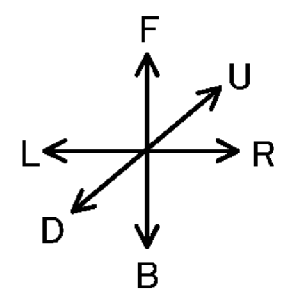

FIG. 20 is a plan view of a valve device 200F installed in a power storage device according to the seventh embodiment. As shown in FIG. 20, the valve device 200F includes a valve function portion 210F and a seal attachment portion 220F. The seal attachment portion 220F is a portion that is at least partially sandwiched between the packaging materials 110, 120 and heat-sealed. The valve function portion 210F and the seal attachment portion 220F have cross-sectional shapes different from those of the first embodiment.

Figure 21:
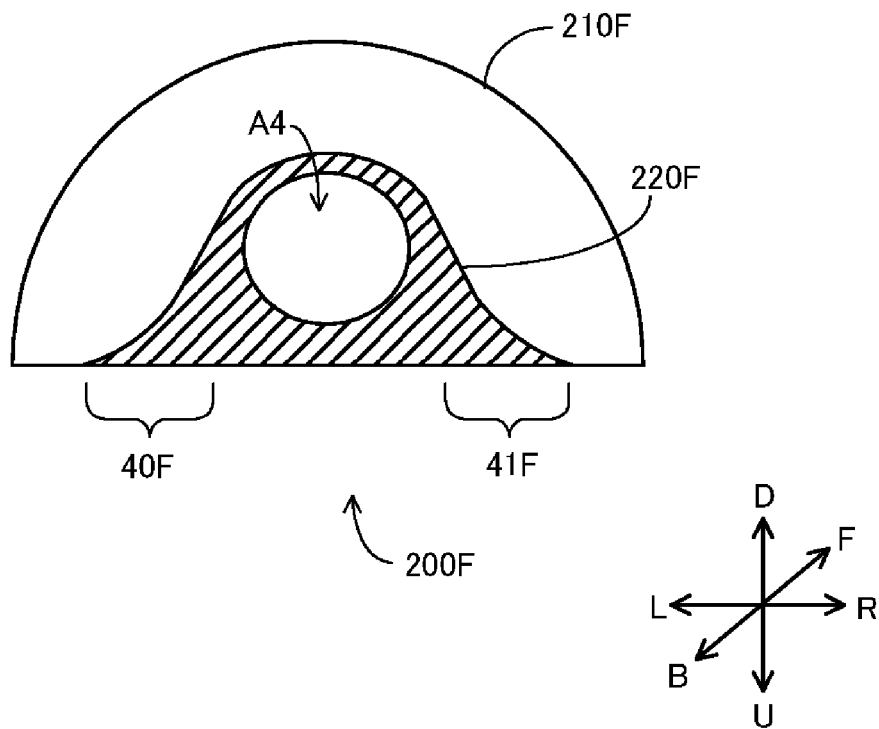
FIG. 21 is a cross-sectional view along XXI-XXI in FIG. 20.

FIG. 21 is a cross-sectional view along XXI-XXI in FIG. 20. As shown in FIG. 21, the valve function portion 210F has a semi-circular cross section. That is, the surface of the valve function portion 210F in the direction of arrow U is a flat surface. Moreover, the cross section of the seal attachment portion 220F has wing-shaped extending ends 40F, 41F on both ends in the direction of arrows LR. The surface of the seal attachment portion 220F in the direction of arrow U is a flat surface. The surface of the valve function portion 210F in the direction of arrow U is flush with the surface of the seal attachment portion 220F in the direction of arrow U.

Therefore, when the valve device 200F is disposed with the surfaces in the direction of arrow U facing down, the valve device 200F does not roll. Therefore, in the power storage device according to the seventh embodiment, the valve device 200F does not roll during attachment of the valve device 200F to the housing 100, which facilitates positioning of the valve device 200F.

Figure 22:
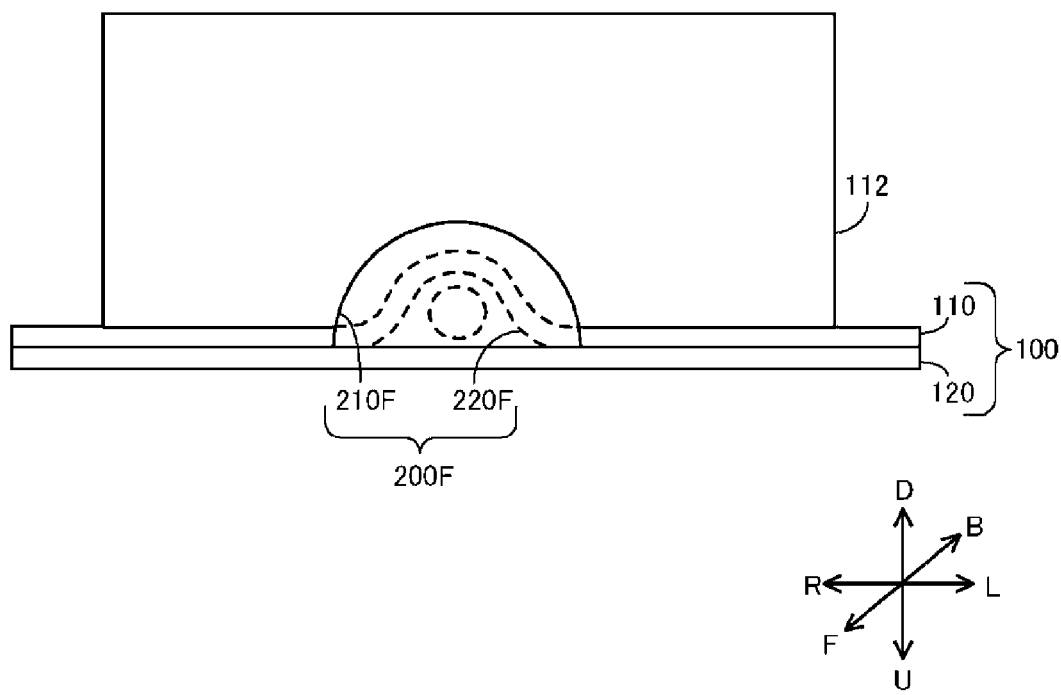
FIG. 22 is a diagram showing the manner in which the valve device is attached to the housing.

FIG. 22 is a diagram showing the manner in which the valve device 200F is attached to the housing 100. As shown in FIG. 22, during attachment of the valve device 200F to the housing 100, the flat surfaces of the valve device 200F are placed on the surface of the innermost layer of the packaging material 120. The valve device 200F in this state does not roll. Therefore, in the power storage device according to the seventh embodiment, during attachment of the valve device 200F to the housing 100, the valve device 200F can be easily positioned. Moreover, in an assembled state of the power storage device, the bulging of the peripheral bonded portion 130 due to the valve device 200F can face the direction of bulging of the housing 100, i.e., in FIG. 22, in an upward direction in which the molded portion 112 protrudes.

The valve device 200F represents one example of the "valve device" of the present disclosure, the valve function portion 210F represents one example of the "first portion" of the present disclosure, and the seal attachment portion 220F represents one example of the "second portion" of the present disclosure. The vent passage A4 represents one example of the "vent passage" of the present disclosure.

8. Modifications

While the first to seventh embodiments have been described above, the present disclosure is not limited thereto, and various changes can be made without departing from the spirit of the present disclosure. Modifications will be hereinafter described. It should be noted that the following modifications can be combined as appropriate.

<8-1>

In the first to seventh embodiments, the cross section of the seal attachment portion (such as the seal attachment portion 220) has a circle-based shape. However, the cross-sectional shape of the seal attachment portion is not limited thereto. For example, the seal attachment portion may have a polygon-based cross-sectional shape.

Figure 23:
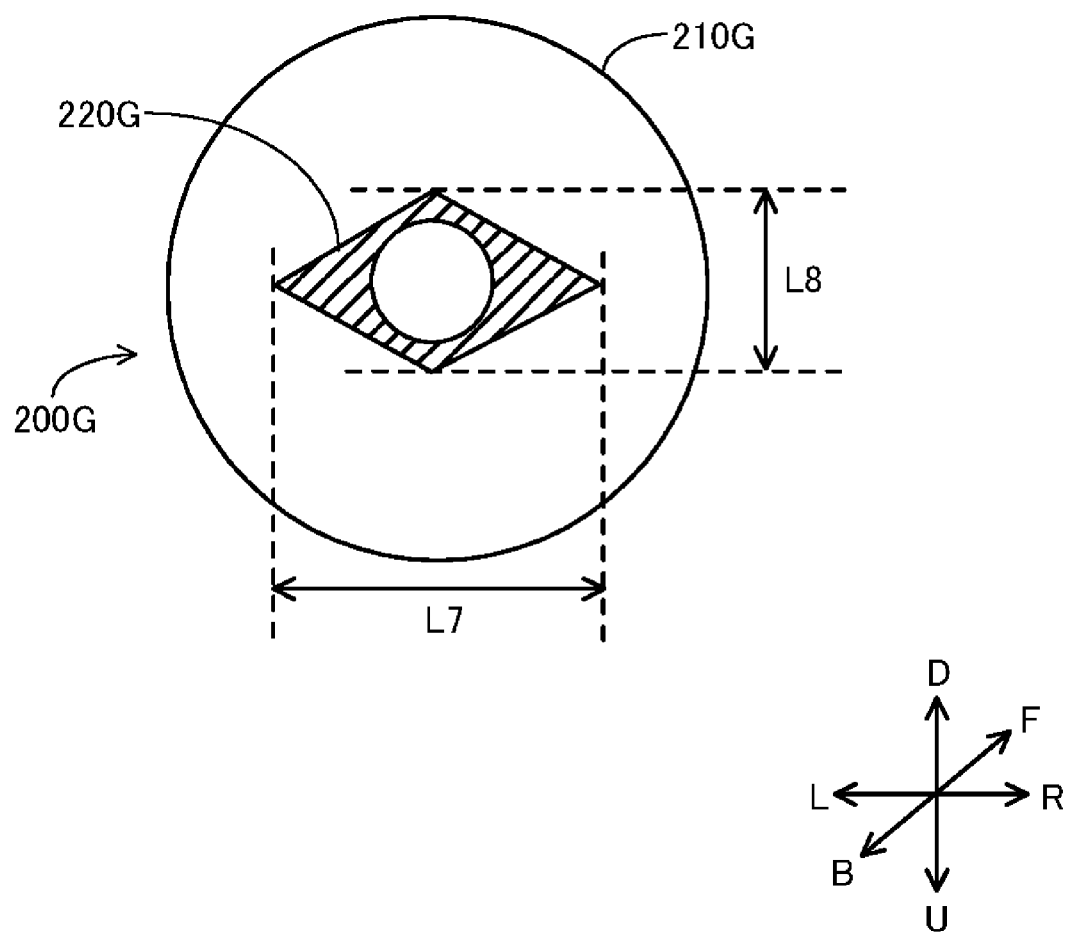
FIG. 23 is a diagram showing a cross section of a valve device according to a first modification.

FIG. 23 is a diagram showing a cross section of a valve device 200G according to a first modification. As shown in FIG. 23, in the valve device 200G, the cross section of a seal attachment portion 220G has a rhombus shape. In the seal attachment portion 220G, a length L7 in the width direction of the power storage device is greater than a length L8 in the thickness direction of the power storage device. In this power storage device, the difference between the length in the thickness direction of the power storage device in the region of the peripheral bonded portion 130 where the seal attachment portion 220G is sandwiched and the length in the thickness direction of the power storage device in the region of the peripheral bonded portion 130 where the seal attachment portion 220G is not sandwiched is small. Therefore, in this power storage device, an appropriate amount of pressure and heat can be applied to the heat-sealable resin layers 35 throughout the periphery of the housing 100, and the opposing heat-sealable resin layers 35 can be properly fused, such that the seal attachment portion 220G of the valve device 200G can be firmly fixed to the housing 100.

Figure 24:
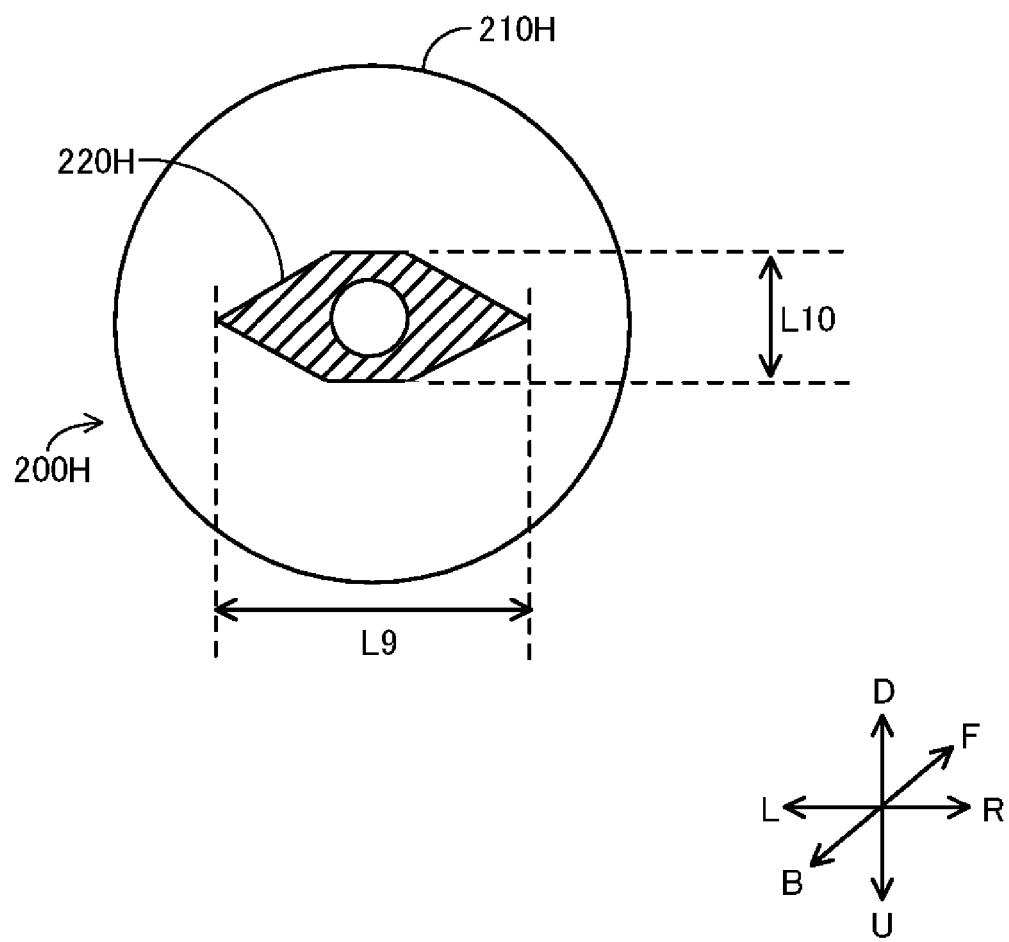
FIG. 24 is a diagram showing a cross section of a valve device according to a second modification.

FIG. 24 is a diagram showing a cross section of a valve device 200H according to a second modification. As shown in FIG. 24, in the valve device 200H, the cross section of a seal attachment portion 220H has a rhombus shape chamfered at both ends in the thickness direction of the power storage device, or a hexagonal shape. In the seal attachment portion 220H, a length L9 in the width direction of the power storage device is greater than a length L10 in the thickness direction of the power storage device. In this power storage device, the difference between the length in the thickness direction of the power storage device in the region of the peripheral bonded portion 130 where the seal attachment portion 220H is sandwiched and the length in the thickness direction of the power storage device in the region of the peripheral bonded portion 130 where the seal attachment portion 220H is not sandwiched is small. Therefore, in this power storage device, an appropriate amount of pressure and heat can be applied to the heat-sealable resin layers 35 throughout the periphery of the housing 100, and the opposing heat-sealable resin layers 35 can be properly fused, such that the seal attachment portion 220H of the valve device 200H can be firmly fixed to the housing 100.

Figure 25:
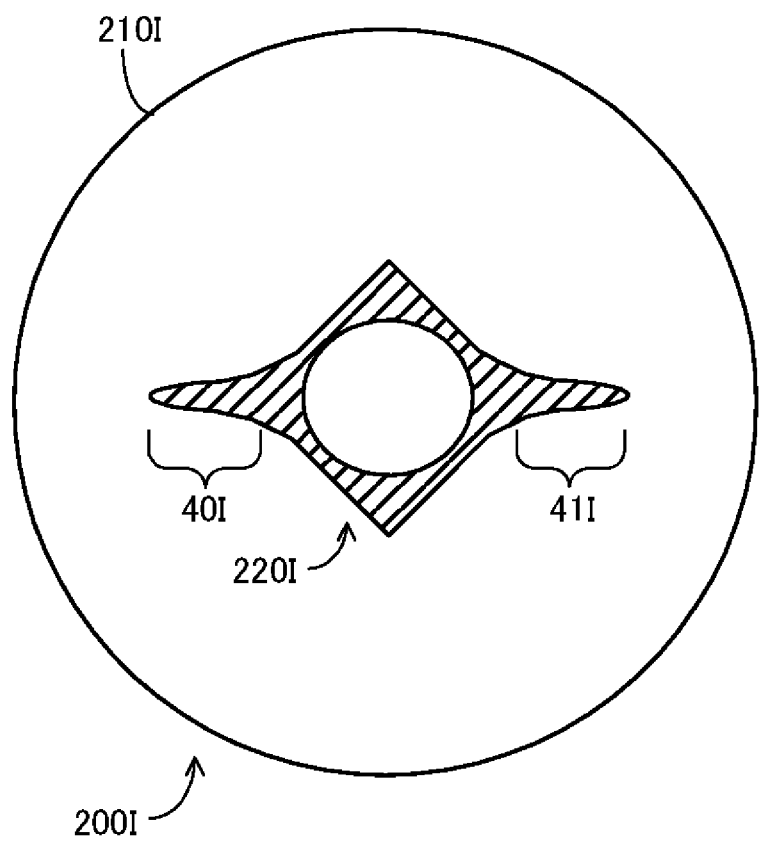
FIG. 25 is a diagram showing a cross section of a valve device according to a third modification.
Figure 25:
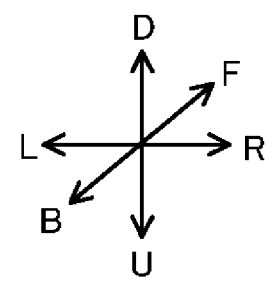

FIG. 25 is a diagram showing a cross section of a valve device 200I according to a third modification. As shown in FIG. 25, in the valve device 200I, the cross section of a seal attachment portion 220I has a shape in which wing-shaped extending ends 401, 411 are provided on both ends (in the width direction of the power storage device) of a rhombus. In this power storage device, the change in the thickness direction of the power storage device in a position of transition from the region of the peripheral bonded portion 130 where the seal attachment portion 220I is not sandwiched, to the region of the peripheral bonded portion 130 where the seal attachment portion 220I is sandwiched, is smooth, compared to, for example, the first embodiment (in which the seal attachment portion 220I is not provided with the wing-shaped extending ends 401, 411). Therefore, in this power storage device, there is no excessive force applied on the packaging materials 110, 120 at the boundary between the position where the seal attachment portion 220I is sandwiched between the heat-sealable resin layers 35 and the position where the seal attachment portion 220I is not sandwiched between the heat-sealable resin layers 35, such that the seal attachment portion 220I of the valve device 200I can be firmly fixed to the housing 100.

Figure 26:
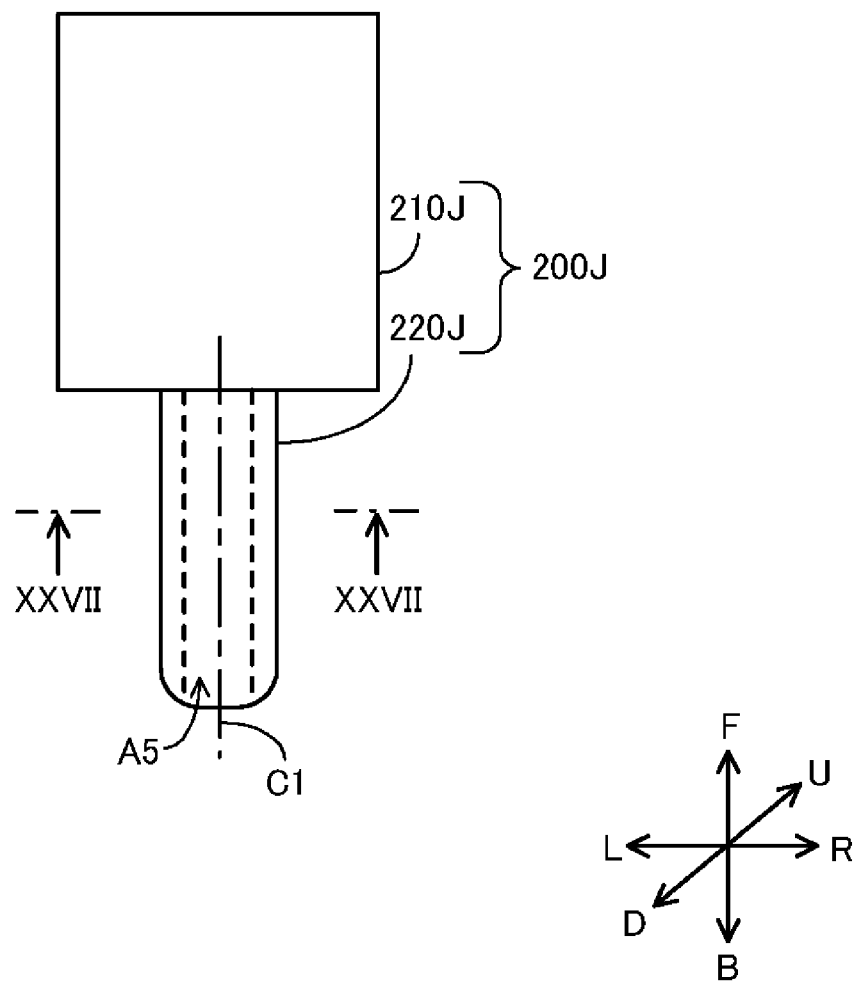
FIG. 26 is a plan view of a valve device according to a fourth modification.

FIG. 26 is a plan view of a valve device 200J according to a fourth modification. As shown in FIG. 26, the valve device 200J includes a valve function portion 210J and a seal attachment portion 220J. A vent passage A5 is formed in the seal attachment portion 220J.

Figure 27:
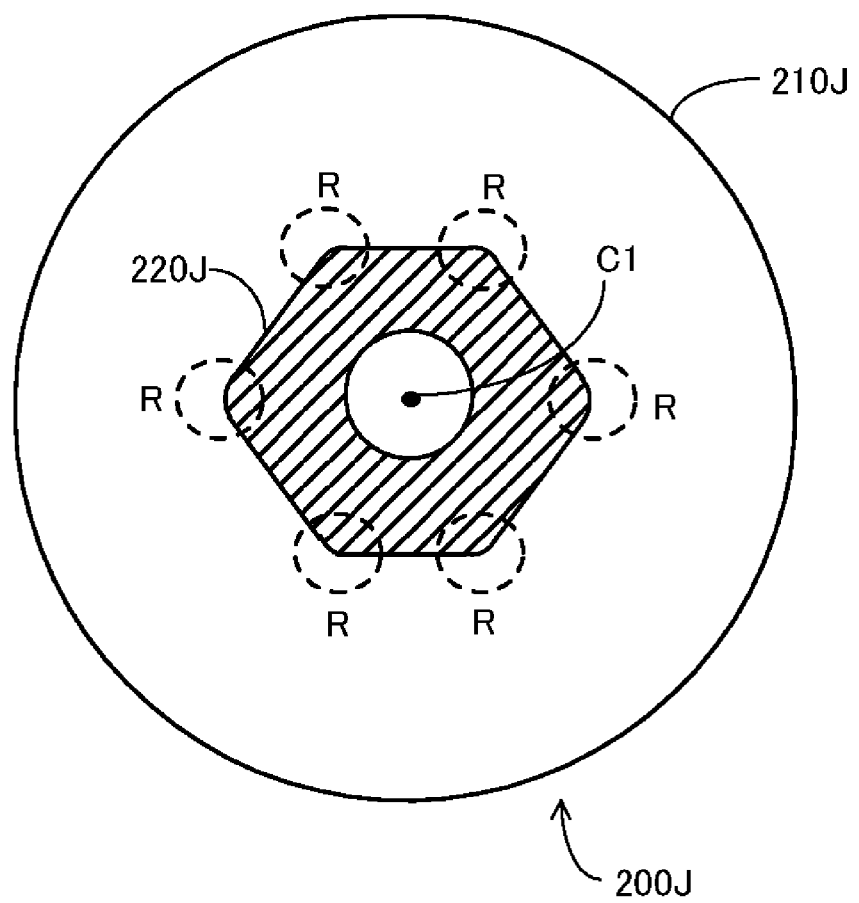
FIG. 27 is a cross-sectional view along XXVII-XXVII in FIG. 26.
Figure 27:
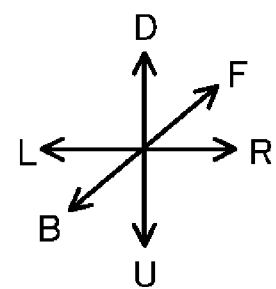

FIG. 27 is a cross-sectional view along XXVII-XXVII in FIG. 26. This cross section can be defined as a surface along a center line C1 of the vent passage A5 taken as the normal. As shown in FIG. 27, in the valve device 200J, the cross section of the seal attachment portion 220J has a hexagonal (polygonal) shape. R (for example, R=0.2 to 2.0 mm) is formed at the corners of the hexagon. In this power storage device, for example, the possibility that the region of the seal attachment portion 220J positioned in the housing 100 damages the power storage device element 400 in the housing 100 can be reduced, and also the possibility that the region of the seal attachment portion 220J sandwiched between the heat-sealable resin layers 35 damages the heat-sealable resin layers 35, which causes a decrease in the insulation properties of the heat-sealable resin layers 35, can be reduced.

<8-2>

In the first to seventh embodiments, the flange portion 114 of the packaging material 110 is flat. However, the shape of the flange portion 114 is not limited thereto. For example, the flange portion 114 may have a pre-formed valve device disposition portion where the seal attachment portion 220 of the valve device 200 is to be disposed.

Figure 28:
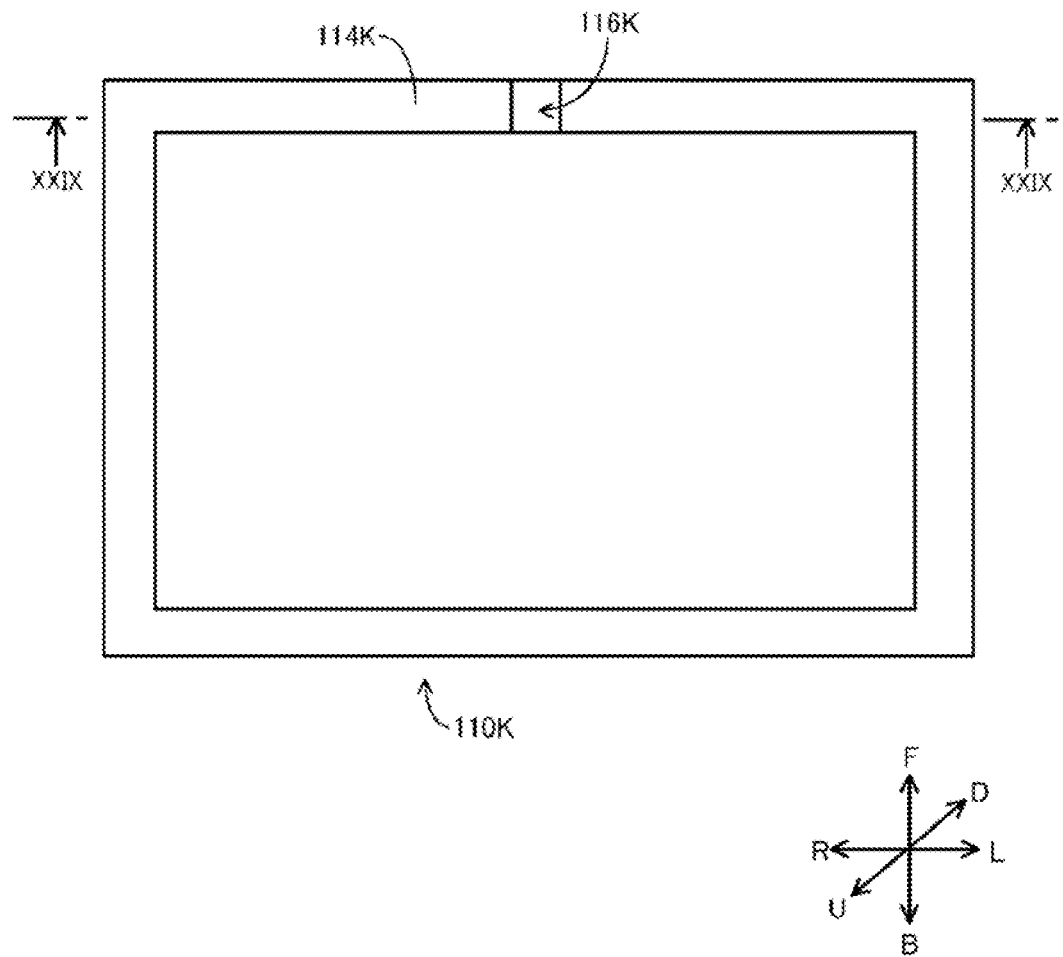
FIG. 28 is a plan view of a packaging material according to a fifth modification.

FIG. 28 is a plan view of a packaging material 110K according to a fifth modification. As shown in FIG. 28, a valve device disposition portion 116K is formed on a flange portion 114K.

Figure 29:
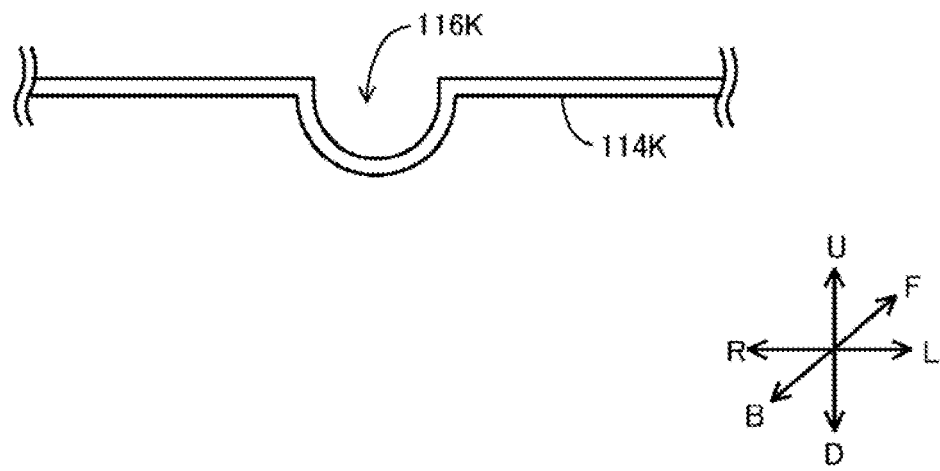
FIG. 29 is a cross-sectional view along XXIX-XXIX in FIG. 28.

FIG. 29 is a cross-sectional view along XXIX-XXIX in FIG. 28. As shown in FIG. 29, the valve device disposition portion 116K formed on the flange portion 114K has a semi-circular shape. This semi-circle has a diameter slightly greater than the diameter of the seal attachment portion 220, for example. The heat-sealing on the periphery of the housing is performed with, for example, the seal attachment portion 220 being disposed in the valve device disposition portion 116K. This can prevent deformation of the packaging materials during the heat-sealing, and reduce the possibility of pinholes and breakage occurring near the seal attachment portion 220. The valve device disposition portion 116K may not necessarily be provided on the packaging material 110K, and may be provided on the packaging material 120. This also results in the same effect as achieved when the valve device disposition portion 116K is provided on the packaging material 110K.

<8-3>

In the first to seventh embodiments, the seal attachment portion (for example, the seal attachment portion 220) is only partially sandwiched between the heat-sealable resin layers 35 in the peripheral bonded portion 130. However, the attached state of the seal attachment portion is not limited thereto. For example, the entire seal attachment portion may be sandwiched between the heat-sealable resin layers 35 in the peripheral bonded portion 130. In this case also, because R is formed at the corners in plan view of the end of the seal attachment portion (for example, the seal attachment portion 220) opposite to the valve function portion (for example, the valve function portion 210), the end is unlikely to damage the heat-sealable resin layer 35 to cause a decrease in the insulation properties of the heat-sealable resin layer 35.

<8-4>

In the first to seventh embodiments, in the valve device (for example, the valve device 200), a step is formed at the boundary between the valve function portion (for example, the valve function portion 210) and the seal attachment portion (for example, the seal attachment portion 220). However, a step may not necessarily be formed at the boundary between the valve function portion and the seal attachment portion. For example, the cross-sectional diameters of the valve function portion and the seal attachment portion may be identical, such that the valve function portion and the seal attachment portion may be connected flatly.

<8-5>

In the first to seventh embodiments, the cross section of the vent passage (for example, the vent passage A1) formed in the seal attachment portion (such as the seal attachment portion 220) has a circle-based shape. However, the cross-sectional shape of the vent passage is not limited thereto. For example, the vent passage may have a polygon-based cross-sectional shape.

<8-6>

In the first to seventh embodiments, R is formed at the corners of the end of the seal attachment portion (for example, the seal attachment portion 220) opposite to the valve function portion (for example, the valve function portion 210). However, R may not necessarily be formed at the corners.

<8-7>

In the first to seventh embodiments, the valve device (for example, the valve device 200) is a so-called check valve.

<8-8>

With reference again to FIG. 1, in the first to seventh embodiments, the tabs 300 are provided on both ends in the direction of arrows LR of the housing 100, and the valve device (for example, the valve device 200) is provided on the end in the direction of arrow F of the housing 100. However, the positional relationship between the valve device 200 and the tabs 300 is not limited thereto. For example, both tabs 300 may be disposed on an identical side of the periphery of the housing 100, and the valve device may be disposed between the two tabs 300. Alternatively, both tabs 300 may be disposed on an identical side of the periphery of the housing 100, and the valve device may be disposed on any of the three sides other than the side on which the tabs 300 are provided.

<8-9>

In the first to seventh embodiments, the housing 100 includes the packaging material 110 molded by embossing or the like and the packaging material 120 separate from the packaging material 110. The housing 100, however, may not necessarily have this structure.

For example, the packaging material 110 and the packaging material 120 may previously be integrally formed (connected) on one side. In this case, the packaging material 110 and the packaging material 120 may be integrally formed (connected) on an end of the flange portion 114 of the packaging material 110, and the housing 100 may be four-side sealed with the packaging material 110 and the packaging material 120 being placed over each other, such that the power storage device element 400 is hermetically sealed in the housing 100. Alternatively, the flange portion 114 may be omitted on the side on which the packaging material 110 and the packaging material 120 are integrally formed, and the housing 100 may be three-side sealed with the packaging material 110 and the packaging material 120 being placed over each other, such that the power storage device element 400 is hermetically sealed in the housing 100.

Moreover, for example, the packaging material 120 may be molded into the same shape as that of the packaging material 110. Moreover, the housing 100 may be a pouched-type housing, for example. The pouched-type housing may be of any type of a three-side seal type, a four-side seal type, a pillow type, a gusset type, and the like.

<8-10>

In the first to seventh embodiments, the casing of the valve function portion (for example, the valve function portion 210) and the casing of the seal attachment portion (for example, the seal attachment portion 220) are formed of an identical material (resin). However, the casing of the valve function portion and the casing of the seal attachment portion may not necessarily be formed of an identical material. For example, the casing of the valve function portion and the casing of the seal attachment portion may be formed of different materials, and the material of the valve function portion may have a melting point higher than that of the material of the seal attachment portion. For example, the valve function portion may be formed of polypropylene (PP), and the seal attachment portion may be formed of a metal or a resin (such as a fluororesin, a polyester-based resin, a polyimide-based resin, a polycarbonate-based resin, or an acrylic resin) having a melting point higher than that of PP. The resin to be used as the seal attachment portion is preferably a high-barrier fluororesin.

In this power storage device, even if pressure and heat are applied to the seal attachment portion during fusion of the opposing heat-sealable resin layers 35, the melting point of the material of the valve function portion is higher than the melting point of the material of the seal attachment portion, such that the valve function portion is unlikely to be deformed by the heat. Therefore, in this power storage device, a failure of the valve mechanism in the valve function portion during fusion of the opposing heat-sealable resin layers 35 can be prevented.

<8-11>

In the first to seventh embodiments, the casing of the valve device 200 is made of a resin, and the seal attachment portion 220 is directly sandwiched between the heat-sealable resin layers 35. However, the casing of the valve device 200 may not necessarily be made of a resin, and may be made of, for example, a metal (such as aluminum or stainless steel). In this case, an adhesive protective film may be disposed between the seal attachment portion 220 and the heat-sealable resin layers 35. The adhesive protective film is configured so that one surface adheres to at least a resin, and the other surface adheres to at least a metal. The adhesive protective film may be any of various known adhesive protective films, and may be, for example, the same adhesive protective film as the tab film 310.

<8-12>

In the first to seventh embodiments, R is formed on the outer periphery (corners of the end of the seal attachment portion (for example, the seal attachment portion 220) opposite to the valve function portion (for example, the valve function portion 210)) of the seal attachment portion, whereas R is not formed on the inner periphery (edge of the vent passage (for example, the vent passage A1)) of the seal attachment portion. However, R may be formed on the inner periphery of the seal attachment portion. When R is formed on the inner periphery of the seal attachment portion, the possibility that the corners on the inner periphery of the seal attachment portion are chipped, which causes the debris (such as the resin or metal) to drop into the housing 100, can be reduced.

<8-13>

With reference again to FIG. 21, in the seventh embodiment, the outer surfaces of both the valve function portion 210F and the seal attachment portion 220F form flat surfaces. However, the outer surfaces of both the valve function portion 210F and the seal attachment portion 220F may not necessarily form flat surfaces. The outer surface of at least one of the valve function portion 210F and the seal attachment portion 220F may form a flat surface.

<8-14>

While the power storage device 10 in the first to seventh embodiments is a secondary battery, it is defined by the concept of something that outputs electricity. Thus, the power storage device 10 also includes power storage devices such as capacitors, electric double layer capacitors (EDLCs), and lithium ion capacitors. While the type of the secondary battery is not limited, examples include lithium ion batteries, lithium ion polymer batteries, lead storage batteries, nickel-hydrogen batteries, nickel-cadmium batteries, nickel-iron storage devices, nickel-zinc storage batteries, silver oxide-zinc storage batteries, metal-air batteries, polyvalent cation batteries, and all-solid-state batteries.

EXAMPLES

The present disclosure will be hereinafter described in detail with reference to examples and comparative examples, although the present disclosure is not limited thereto.

Example 1

Figure 30:
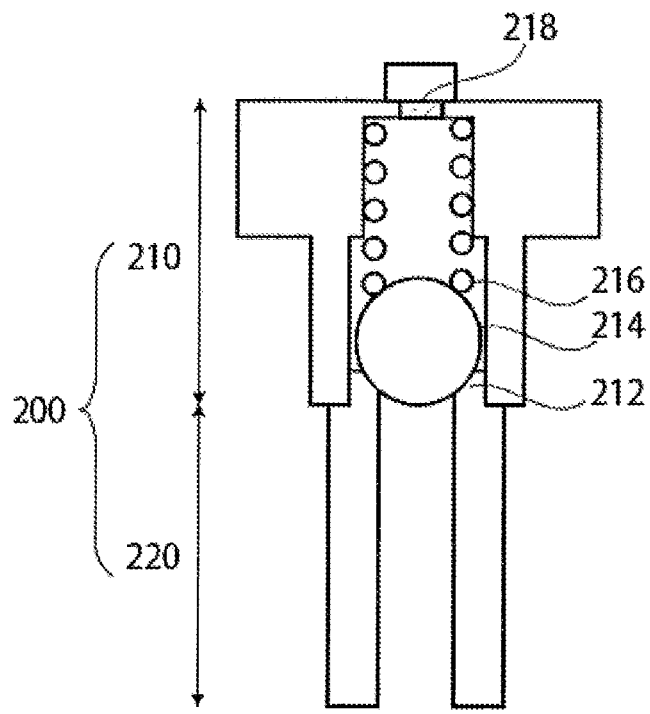
FIG. 30 is a schematic cross-sectional view of a valve device used in the examples.

A valve device having a cross-sectional structure as shown in the schematic diagram of FIG. 30 was produced. In the design of Example 1, a ball 214 having a diameter of 4 mm is formed of a fluororubber (hardness: 90) ball, a valve seat 212 having an opening diameter of 3 mm is formed of stainless steel (SUS304) surface-coated with perfluoro-alkoxy fluororesin (PFA), and the opening of the valve seat 212 is sealed with the ball 214. The casing portion of a valve function portion 210 and the valve seat 212 are integral with each other, and the valve seat 212 is formed by the region that touches the ball 214 in the casing portion of the valve function portion 210 formed of stainless steel (SUS304). The ball 214 and the valve seat 212 were produced with high precision by machining, and the place of the valve seat 212 that touches the ball 214 was processed to conform to the surface shape of the ball 214. The differential pressure between the primary side and the secondary side at which the valve device is opened was designed to be 0.1 MPa.

Example 2

A valve device having a cross-sectional structure as shown in the schematic diagram of FIG. 30 was produced. In the design of Example 2, a ball 214 having a diameter of 4 mm is formed of a fluororubber (hardness: 90) ball, a valve seat 212 having an opening diameter of 3 mm is formed of polytetrafluoroethylene (PTFE), and the opening of the valve seat 212 is sealed with the ball 214. As in Example 1, the casing portion of a valve function portion 210 and the valve seat 212 are integral with each other, and the valve seat 212 is formed by the region that touches the ball 214 in the casing portion of the valve function portion 210 formed of polytetrafluoroethylene (PTFE). The ball 214 and the valve seat 212 were produced with high precision by machining, and the place of the valve seat 212 that touches the ball 214 was processed to conform to the surface shape of the ball 214. The differential pressure between the primary side and the secondary side at which the valve device is opened was designed to be 0.1 MPa.

Example 3

A valve device having a cross-sectional structure as shown in the schematic diagram of FIG. 30 was produced. In the design of Example 3, a ball 214 having a diameter of 1.5 mm is formed of a stainless steel (SUS304) ball, a valve seat 212 having an opening diameter of 1 mm is formed of stainless steel (SUS304), and the opening of the valve seat 212 is sealed with the ball 214. The casing portion of a valve function portion 210 and the valve seat 212 are integral with each other, and the valve seat 212 is formed by the region that touches the ball 214 in the casing portion of the valve function portion 210 formed of stainless steel (SUS304). The ball 214 and the valve seat 212 were produced with high precision by machining, and the place of the valve seat 212 that touches the ball 214 was processed to conform to the surface shape of the ball 214. The differential pressure between the primary side and the secondary side at which the valve device is opened was designed to be 0.1 MPa. In the valve device produced in Example 3, in order to set the amount of helium leakage from the secondary side to the primary side of the valve device in the range of about $5.0 \times 10^{-11}$ Pa·m$^3$/sec to $1.5 \times 10^{-10}$ Pa·m$^3$/sec, the shape of the region where the valve seat and the ball of the valve mechanism are in contact with each other was designed and processed with extremely high precision, at a high level heretofore unattained in conventional check valves.

Example 4

A valve device having a cross-sectional structure as shown in the schematic diagram of FIG. 30 was produced. In the design of Example 4, a ball 214 having a diameter of 1.5 mm is formed of a fluororubber (hardness: 50) ball, a valve seat 212 having an opening diameter of 1 mm is formed of stainless steel (SUS304), and the opening of the valve seat 212 is sealed with the ball 214. The casing portion of a valve function portion 210 and the valve seat 212 are integral with each other, and the valve seat 212 is formed by the region that touches the ball 214 in the casing portion of the valve function portion 210 formed of stainless steel (SUS304). The ball 214 and the valve seat 212 were produced with high precision by machining, and the place of the valve seat 212 that touches the ball 214 was processed to conform to the surface shape of the ball 214. The differential pressure between the primary side and the secondary side at which the valve device is opened was designed to be 0.1 MPa. In the valve device produced in Example 4, in order to set the amount of helium leakage from the secondary side to the primary side of the valve device in the range of about $5.0 \times 10^{-11}$ Pa·m$^3$/sec to $1.5 \times 10^{-10}$ Pa·m$^3$/sec, the shape of the region where the valve seat and the ball of the valve mechanism are in contact with each other was designed and processed with extremely high precision, at a high level heretofore unattained in conventional check valves.

Example 5

A valve device having a cross-sectional structure as shown in the schematic diagram of FIG. 30 was produced. In the design of Example 5, a ball 214 having a diameter of 2 mm is formed of a polytetrafluoroethylene (PTFE) ball, a valve seat 212 having an opening diameter of 1.5 mm is formed of a fluororubber, and the opening of the valve seat 212 is sealed with the ball 214. The casing portion of a valve function portion 210 and the valve seat 212 are integral with each other, and the valve seat 212 is formed by the region that touches the ball 214 in the casing portion of the valve function portion 210 formed of a fluororubber. The ball 214 and the valve seat 212 were produced with high precision by machining, and the place of the valve seat 212 that touches the ball 214 was processed to conform to the surface shape of the ball 214. The differential pressure between the primary side and the secondary side at which the valve device is opened was designed to be 0.09 MPa. In the valve device produced in Example 5, in order to set the amount of helium leakage from the secondary side to the primary side of the valve device in the range of about $5.0 \times 10^{-11}$ Pa·m$^3$/sec to $1.5 \times 10^{-10}$ Pa·m$^3$/sec, the shape of the region where the valve seat and the ball of the valve mechanism are in contact with each other was designed and processed with extremely high precision, at a high level heretofore unattained in conventional check valves.

Example 6

A valve device having a cross-sectional structure as shown in the schematic diagram of FIG. 30 was produced. In the design of Example 6, a ball 214 having a diameter of 1.5 mm is formed of a stainless steel (SUS304) ball, a valve seat 212 having an opening diameter of 1 mm is formed of stainless steel (SUS304), and the opening of the valve seat 212 is sealed with the ball 214. The casing portion of a valve function portion 210 and the valve seat 212 are integral with each other, and the valve seat 212 is formed by the region that touches the ball 214 in the casing portion of the valve function portion 210 formed of stainless steel (SUS304). The ball 214 and the valve seat 212 were produced with high precision by machining, and the place of the valve seat 212 that touches the ball 214 was processed to conform to the surface shape of the ball 214. The differential pressure between the primary side and the secondary side at which the valve device is opened was designed to be 0.05 MPa.

Example 7

A valve device having a cross-sectional structure as shown in the schematic diagram of FIG. 30 was produced. In the design of Example 7, a ball 214 having a diameter of 1.5 mm is formed of a stainless steel (SUS304) ball, a valve seat 212 having an opening diameter of 1 mm is formed of stainless steel (SUS304), and the opening of the valve seat 212 is sealed with the ball 214. The casing portion of a valve function portion 210 and the valve seat 212 are integral with each other, and the valve seat 212 is formed by the region that touches the ball 214 in the casing portion of the valve function portion 210 formed of stainless steel (SUS304). The ball 214 and the valve seat 212 were produced with high precision by machining, and the place of the valve seat 212 that touches the ball 214 was processed to conform to the surface shape of the ball 214. The differential pressure between the primary side and the secondary side at which the valve device is opened was designed to be 0.1 MPa. In the valve device produced in Example 7, in order to set the amount of helium leakage from the secondary side to the primary side of the valve device in the range of about $5.0 \times 10^{-11}$ Pa·m$^3$/sec to $1.5 \times 10^{-10}$ Pa·m$^3$/sec, the shape of the region where the valve seat and the ball of the valve mechanism are in contact with each other was designed and processed with extremely high precision, at a high level heretofore unattained in conventional check valves.

Example 8

A valve device having a cross-sectional structure as shown in the schematic diagram of FIG. 30 was produced. In the design of Example 8, a ball 214 having a diameter of 4 mm is formed of a polytetrafluoroethylene (PTFE) ball, a valve seat 212 having an opening diameter of 3 mm is formed of a fluororubber, and the opening of the valve seat 212 is sealed with the ball 214. The casing portion of a valve function portion 210 and the valve seat 212 are integral with each other, and the valve seat 212 is formed by the region that touches the ball 214 in the casing portion of the valve function portion 210 formed of a fluororubber. The ball 214 and the valve seat 212 were produced with high precision by machining, and the place of the valve seat 212 that touches the ball 214 was processed to conform to the surface shape of the ball 214. The differential pressure between the primary side and the secondary side at which the valve device is opened was designed to be 0.1 MPa.

Example 9

A valve device having a cross-sectional structure as shown in the schematic diagram of FIG. 30 was produced. In the design of Example 9, a ball 214 having a diameter of 4 mm is formed of a fluororubber (hardness: 70) ball, a valve seat 212 having an opening diameter of 3 mm is formed of polytetrafluoroethylene (PTFE), and the opening of the valve seat 212 is sealed with the ball 214. As in Example 1, the casing portion of a valve function portion 210 and the valve seat 212 are integral with each other, and the valve seat 212 is formed by the region that touches the ball 214 in the casing portion of the valve function portion 210 formed of polytetrafluoroethylene (PTFE). The ball 214 and the valve seat 212 were produced with high precision by machining, and the place of the valve seat 212 that touches the ball 214 was processed to conform to the surface shape of the ball 214. The differential pressure between the primary side and the secondary side at which the valve device is opened was designed to be 0.1 MPa.

Example 10

A valve device having a cross-sectional structure as shown in the schematic diagram of FIG. 30 was produced. In the design of Example 10, a ball 214 having a diameter of 4 mm is formed of a fluororubber (hardness: 50) ball, a valve seat 212 having an opening diameter of 3 mm is formed of polytetrafluoroethylene (PTFE), and the opening of the valve seat 212 is sealed with the ball 214. As in Example 1, the casing portion of a valve function portion 210 and the valve seat 212 are integral with each other, and the valve seat 212 is formed by the region that touches the ball 214 in the casing portion of the valve function portion 210 formed of polytetrafluoroethylene (PTFE). The ball 214 and the valve seat 212 were produced with high precision by machining, and the place of the valve seat 212 that touches the ball 214 was processed to conform to the surface shape of the ball 214. The differential pressure between the primary side and the secondary side at which the valve device is opened was designed to be 0.1 MPa.

Comparative Example 1

A valve device having a cross-sectional structure as shown in the schematic diagram of FIG. 30 was produced. In the design of Comparative Example 1, the ball 214 is replaced by a conical member (formed of stainless steel (SUS304)) with a bottom diameter of 1.5 mm, a valve seat 212 having an opening diameter of 1 mm is formed of stainless steel (SUS304), and the opening of the valve seat 212 is sealed with the conical member. As in Example 1, the casing portion of a valve function portion 210 and the valve seat 212 are integral with each other, and the valve seat 212 is formed by the region that touches the conical member in the casing portion of the valve function portion 210 formed of stainless steel (SUS304). The conical member and the valve seat 212 were produced with general high precision by machining, and the place of the valve seat 212 that touches the conical member was processed to conform to the surface shape of the conical member. The differential pressure between the primary side and the secondary side at which the valve device is opened was designed to be 0.1 MPa.

Comparative Example 2

A valve device having a cross-sectional structure as shown in the schematic diagram of FIG. 30 was produced. In the design of Comparative Example 2, a ball 214 having a diameter of 4 mm is formed of a stainless steel (SUS304) ball, a valve seat 212 having an opening diameter of 3 mm is formed of stainless steel (SUS304), and the opening of the valve seat 212 is sealed with the ball 214. As in Example 1, the casing portion of a valve function portion 210 and the valve seat 212 are integral with each other, and the valve seat 212 is formed by the region that touches the ball 214 in the casing portion of the valve function portion 210 formed of stainless steel (SUS304). The ball 214 and the valve seat 212 were produced with general precision by machining, and the place of the valve seat 212 that touches the ball 214 was processed to conform to the surface shape of the ball 214. The differential pressure between the primary side and the secondary side at which the valve device is opened was designed to be 0.1 MPa.

Comparative Example 3

A valve device having a cross-sectional structure as shown in the schematic diagram of FIG. 30 was produced. In the design of Comparative Example 3, a ball 214 having a diameter of 4 mm is formed of an aluminum alloy ball, a valve seat 212 having an opening diameter of 3 mm is formed of an aluminum alloy, and the opening of the valve seat 212 is sealed with the ball 214. As in Example 1, the casing portion of a valve function portion 210 and the valve seat 212 are integral with each other, and the valve seat 212 is formed by the region that touches the ball 214 in the casing portion of the valve function portion 210 formed of an aluminum alloy. The ball 214 and the valve seat 212 were produced with general precision by machining, and the place of the valve seat 212 that touches the ball 214 was processed to conform to the surface shape of the ball 214. The differential pressure between the primary side and the secondary side at which the valve device is opened was designed to be 0.1 MPa.

Comparative Example 4

A valve device having a cross-sectional structure as shown in the schematic diagram of FIG. 30 was produced. In the design of Comparative Example 4, the ball 214 is replaced by a conical member (formed of an aluminum alloy) with a bottom diameter of 1.5 mm, a valve seat 212 having an opening diameter of 1 mm is formed of an aluminum alloy, and the opening of the valve seat 212 is sealed with the conical member. As in Example 1, the casing portion of a valve function portion 210 and the valve seat 212 are integral with each other, and the valve seat 212 is formed by the region that touches the conical member in the casing portion of the valve function portion 210 formed of an aluminum alloy. The conical member and the valve seat 212 were produced with high precision by machining, and the place of the valve seat 212 that touches the conical member was processed to conform to the surface shape of the conical member. The differential pressure between the primary side and the secondary side at which the valve device is opened was designed to be 0.1 MPa.

Comparative Example 5

A valve device having a cross-sectional structure as shown in the schematic diagram of FIG. 30 was produced. In the design of Comparative Example 5, a ball 214 having a diameter of 4 mm is formed of a fluororubber (hardness: 90) ball, a valve seat 212 having an opening diameter of 3 mm is formed of an aluminum alloy, and the opening of the valve seat 212 is sealed with the ball 214. As in Example 1, the casing portion of a valve function portion 210 and the valve seat 212 are integral with each other, and the valve seat 212 is formed by the region that touches the ball 214 in the casing portion of the valve function portion 210 formed of an aluminum alloy. The ball 214 and the valve seat 212 were produced with general precision by machining, and the place of the valve seat 212 that touches the ball 214 was processed to conform to the surface shape of the ball 214. The differential pressure between the primary side and the secondary side at which the valve device is opened was designed to be 0.1 MPa.

Comparative Example 6

A valve device having a cross-sectional structure as shown in the schematic diagram of FIG. 30 was produced. In the design of Comparative Example 6, a ball 214 having a diameter of 4 mm is formed of a fluororubber (hardness: 90) ball, a valve seat 212 having an opening diameter of 3 mm is formed of stainless steel (SUS304), and the opening of the valve seat 212 is sealed with the ball 214. As in Example 1, the casing portion of a valve function portion 210 and the valve seat 212 are integral with each other, and the valve seat 212 is formed by the region that touches the ball 214 in the casing portion of the valve function portion 210 formed of stainless steel (SUS304). The ball 214 and the valve seat 212 were produced with general precision by machining, and the place of the valve seat 212 that touches the ball 214 was processed to conform to the surface shape of the ball 214. The differential pressure between the primary side and the secondary side at which the valve device is opened was designed to be 0.1 MPa.

Reference Example 1

A valve device having a cross-sectional structure as shown in FIG. 30 was produced. In the design of Reference Example 1, a ball 214 having a diameter of 1.5 mm is formed of a fluororubber (hardness: 50) ball, a valve seat 212 having an opening diameter of 1 mm is formed of a fluororubber (hardness: 90), and the opening of the valve seat 212 is sealed with the ball 214. As in Example 1, the casing portion of a valve function portion 210 and the valve seat 212 are integral with each other, and the valve seat 212 is formed by the region that touches the ball 214 in the casing portion of the valve function portion 210 formed of stainless steel (SUS304). The ball 214 and the valve seat 212 were produced with high precision by machining, and the place of the valve seat 212 that touches the ball 214 was processed to conform to the surface shape of the ball 214. The differential pressure between the primary side and the secondary side at which the valve device is opened was designed to be 0.1 MPa. In the valve device produced in Reference Example 1, in order to reduce the amount of helium leakage from the secondary side to the primary side of the valve device below $5.0 \times 10^{-11}$ Pa·m$^3$/sec, the shape of the region where the valve seat and the ball of the valve mechanism are in contact with each other was designed and processed with extremely high precision, at a high level heretofore unattained in conventional check valves.

[Helium Leak Test]

The amount of helium leakage from the secondary side to the primary side of the valve device produced in each of Examples 1 to 10, Comparative Examples 1 to 6, and Reference Example 1 was measured in accordance with the method defined in "Vacuum spraying method (spray method)" of "Method for helium leak testing" in JIS Z 2331: 2006. Specifically, the MS-50 helium leak detector available from Vacuum Instrument Corporation was used as a testing apparatus. The gas valve of the valve device was mounted in a leak test jig (when a dummy valve device having a blocked gas valve was placed in a leak test jig, the jig was previously verified to have no helium leak), and then to the helium leak detector via a test port. It was also verified that there was no helium leak between the jig and the helium leak detector. Thereafter, the valve device was evacuated to 13 Pa from the primary side, and then 99.99% helium gas was sprayed to the valve device from the secondary side, and measurement was started. The spraying was performed for 1 to 2 seconds, and the waiting time was 2 to 4 seconds. The evaluation results were recorded. As a precaution, the same valve was covered with a hood having a volume of 50 ml and allowed to wait for 20 seconds, in accordance with the method defined in "Vacuum covering method (vacuum hood method)" of "Method for helium leak testing" in JIS Z 2331: 2006. As a result, the same measurement results were obtained. The measurement environment temperature was 25° C. in both tests.

[Valve Device Opening Test]

The valve device produced in each of Examples 1 to 10, Comparative Examples 1 to 6, and Reference Example 1 was stored in a 60° C. environment for 10 days and then returned into a room temperature (25° C.) environment. The valve device was mounted on a measurement jig produced using a metal. A compressed-air cylinder was mounted to the primary side of the jig via a compact pressure gauge, a rubber tube was mounted to the secondary side of the jig, and the tip of the rubber tube was mounted to a water bath. The storing in a 60° C. environment for 10 days reproduced the environment in which a power storage device was used without the valve device being opened for a long period of time. If the power storage device is used without the valve device being opened for a long period of time, the valve device is likely to have the problem of not being properly opened, even if the internal pressure increases to a set value. At this time, it was verified previously that there was no leak from the jig or contacts. Air was gradually delivered into the valve device from the primary-side air cylinder, and the pressure at which bubbles started to form from the rubber tube of the water bath was read by the pressure gauge. A reading within the set value ±20% was evaluated as "A" (the opening pressure was favorably maintained), and a reading over ±20% was evaluated as "C" (the opening pressure was not favorably maintained). The results are shown in Table 1.

[Evaluation of Moisture Content after 1 Month]

(Production of a Packaging Material)

As a base material layer, a laminated film was prepared in which a polyethylene terephthalate film (12 μm)/an adhesive agent layer (two-liquid curable urethane adhesive (a polyol compound and an aromatic isocyanate compound), thickness: 3 μm)/a biaxially stretched nylon film (thickness: 15 μm) were laminated in this order. Subsequently, a barrier layer composed of an aluminum foil (JIS H4160: 1994 A8021H-O, thickness: 40 μm), and having acid resistance films formed on both surfaces, was laminated onto the biaxially stretched nylon film (thickness: 15 μm) of the base material layer, using a dry lamination method. Specifically, a two-liquid curable urethane adhesive (a polyol compound and an aromatic isocyanate compound) was applied to one surface of the aluminum foil having acid resistance films formed on both surfaces to form the adhesive agent layer (thickness after curing: 3 μm) on the aluminum foil. Subsequently, the adhesive agent layer on the aluminum foil and the biaxially stretched nylon film were laminated to each other, and then subjected to an aging treatment to prepare a laminate having the base material layer/the adhesive agent layer/the barrier layer. Subsequently, maleic anhydride-modified polypropylene (thickness: 40 μm) as an adhesive layer and polypropylene (thickness: 40 μm) as a heat-sealable resin layer were co-extruded onto the barrier layer of the laminate, such that the adhesive layer/the heat-sealable resin layer were laminated on the barrier layer. Subsequently, the resulting laminate was aged and heated to obtain a packaging material for a power storage device in which the polyethylene terephthalate film (12 μm)/the adhesive agent layer (3 μm)/the biaxially stretched nylon film (15 μm)/the adhesive agent layer (3 μm)/the barrier layer (40 μm)/the adhesive layer (40 μm)/the heat-sealable resin layer (40 μm) were laminated in this order.

(Production of a Test Sample and Measurement of the Moisture Content)

The packaging material for a power storage device obtained above was cut into a rectangular piece with a length of 120 mm and a width of 120 mm. Subsequently, this packaging material was bent into 60 mm in the width direction, and each gas valve was attached to one short side of the packaging material over a sealing width of 7 mm, under conditions of 200° C., 5 seconds, and a pressure of 0.5 MPa. For the sealing place of the gas valve, a heat-weldable film (PPa (44 μm)/PEN (12 μm)/PPa (44 μm)) was previously mounted vertically across the sealing place. Subsequently, the long sides of the packaging material were heat-sealed under conditions of a sealing width of 7 mm, 190° C., 3 seconds, and 1 MPa, 3 g of an electrolytic solution (ethylene carbonate:diethyl carbonate:dimethyl carbonate=1:1:1 (volume ratio)) was sealed into the packaging material through the open short side, and the short side was sealed over a sealing width of 7 mm. This sample was stored in a thermostatic chamber at 65° C. and 90% RH, and then the bag was opened to remove the electrolytic solution from the inside. The moisture content was measured by the Karl Fischer method. Based on an increase in moisture content after 1 month, the effect of preventing the intrusion of moisture from the outside was evaluated according to the criteria shown below. The results are shown in Table 1.

A: less than 100 ppm
B: 100 to 300 ppm
C: over 300 ppm

TABLE 1

|  | Amount of helium leakage (Pa · m/sec) | Valve device opening test | Evaluation of moisture content after 1 month |
|---|---|---|---|
| Example 1 | $4.1 \times 10^{-6}$ | A | B |
| Example 2 | $2.4 \times 10^{-9}$ | A | B |
| Example 3 | $1.1 \times 10^{-10}$ | A | A |
| Example 4 | $7.0 \times 10^{-11}$ | A | A |
| Example 5 | $1.0 \times 10^{-10}$ | A | A |
| Example 6 | $1.8 \times 10^{-10}$ | A | B |
| Example 7 | $1.5 \times 10^{-10}$ | A | A |
| Example 8 | $3.6 \times 10^{-9}$ | A | B |
| Example 9 | $1.5 \times 10^{-9}$ | A | B |
| Example 10 | $1.0 \times 10^{-9}$ | A | B |
| Comparative Example 1 | $1.0 \times 10^{-1}$ | A | C |
| Comparative Example 2 | $2.6 \times 10^{-1}$ | A | C |
| Comparative Example 3 | $2.1 \times 10^{2}$ | A | C |
| Comparative Example 4 | $9.1 \times 10^{-1}$ | A | C |
| Comparative Example 5 | $5.5 \times 10^{-5}$ | A | C |
| Comparative Example 6 | $1.0 \times 10^{-5}$ | A | C |
| Reference Example 1 | $3.2 \times 10^{-11}$ | C | A |

When using the valve device for a power storage device of each of Examples 1 to 10, in which the amount of helium leakage from the secondary side to the primary side of the valve device was $5.0 \times 10^{-11}$ Pa·m$^3$/sec or more and $5.0 \times 10^{-6}$ Pa·m$^3$/sec or less, the valve device was capable of, when a gas was generated inside the power storage device, releasing the gas to the outside, and of highly preventing the intrusion of moisture from the external environment. In particular, when using the valve device for a power storage device of each of Examples 3 to 5 and 7, in which the amount of helium leakage was $5.0 \times 10^{-11}$ Pa·m$^3$/sec to $1.5 \times 10^{-10}$ Pa·m$^3$/sec, the valve device was capable of releasing the gas to the outside, and simultaneously, of more highly preventing the intrusion of moisture from the external environment.

As described above, the present disclosure provides embodiments of the invention as set forth below:

Item 1. A valve device for a power storage device, the power storage device comprising a power storage device element and a housing in which the power storage device element is housed, the valve device for being attached to the housing of the power storage device, wherein the valve device is configured to reduce an internal pressure of the housing when the pressure increases due to a gas generated inside the housing, and in the valve device, an amount of helium leakage from a secondary side to a primary side of the valve device is $5.0 \times 10^{-11}$ Pa·m$^3$/sec or more and $5.0 \times 10^{-6}$ Pa·m$^3$/sec or less, as measured in a 25° C. environment, in accordance with a method defined in "Vacuum spraying method (spray method)" of "Method for helium leak testing" in JIS Z 2331: 2006.

Item 2. The valve device for a power storage device according to item 1, wherein the housing is formed of a laminate including at least a base material layer, a barrier layer, and a heat-sealable resin layer in this order.

Item 3. The valve device for a power storage device according to item 1 or 2, wherein the valve device is designed to be opened when a differential pressure between the primary side and the secondary side of the valve device is in a range of 0.05 to 1 MPa.

Item 4. The valve device for a power storage device according to any one of items 1 to 3, wherein the valve device comprises:

a first portion in which a valve mechanism is formed, the valve mechanism being configured to reduce an internal pressure of the housing when the pressure increases due to a gas generated inside the housing; and a second portion in which a vent passage is formed, the vent passage being configured to guide the gas generated inside the housing to the valve mechanism.

Item 5. The valve device for a power storage device according to item 4, wherein in a thickness direction of the power storage device, the first portion has a length greater than a length of the second portion, and a step is formed at a boundary between the first portion and the second portion.

Item 6. The valve device for a power storage device according to item 4 or 5, wherein the second portion has a length in a width direction of the power storage device greater than the length of the second portion in the thickness direction of the power storage device.

Item 7. The valve device for a power storage device according to any one of items 4 to 6, wherein the second portion has a wing-shaped extending end formed with a thickness that decreases toward an end in a width direction of the housing.

Item 8. The valve device for a power storage device according to any one of items 4 to 7, wherein the vent passage has a circular cross-sectional shape.

Item 9. The valve device for a power storage device according to any one of items 4 to 8, wherein the vent passage has a cross-sectional length in the width direction of the housing greater than a cross-sectional length of the vent passage in the thickness direction of the power storage device.

Item 10. The valve device for a power storage device according to any one of items 4 to 9, wherein the second portion has a pillar formed in the vent passage.

Item 11. The valve device for a power storage device according to any one of items 4 to 10, wherein an outer surface of the second portion has a satin finish surface.

Item 12. The valve device for a power storage device according to any one of items 4 to 11, wherein at least one ridge portion is formed to extend circumferentially on the outer surface of the second portion.

Item 13. The valve device for a power storage device according to any one of items 4 to 12, wherein a corner in plan view of an end of the second portion opposite to the first portion is rounded.

Item 14. The valve device for a power storage device according to any one of items 4 to 13, wherein a cross-sectional outer shape of the second portion is a polygon along a center line of the vent passage taken as the normal, and corners of the polygon are rounded.

Item 15. The valve device for a power storage device according to any one of items 4 to 14, wherein the first portion and the second portion are formed of different materials, and the material of the first portion has a melting point higher than a melting point of the material of the second portion.

Item 16. The valve device for a power storage device according to any one of items 4 to 15, wherein an outer surface of at least one of the first portion and the second portion at least partially forms a flat surface.

Item 17. A power storage device comprising:
a power storage device element;
a housing in which the power storage device element is housed; and
a valve device that communicates with an inside of the housing, wherein
the valve device is configured to reduce an internal pressure of the housing when the pressure increases due to a gas generated inside the housing, and
in the valve device, an amount of helium leakage from a secondary side to a primary side of the valve device is $5.0 \times 10^{-11}$ Pa·m/sec or more and $5.0 \times 10^{-6}$ Pa·m/sec or less, as measured in a 25° C. environment, in accordance with a method defined in "Vacuum spraying method (spray method)" of "Method for helium leak testing" in JIS Z 2331: 2006.

REFERENCE SIGNS LIST

10: power storage device; 31: base material layer; 32: adhesive agent layer; 33: barrier layer; 34: adhesive layer; 35: heat-sealable resin layer; 40, 401, 41, 411: wing-shaped extending end; 50, 51: pillar; 60: ridge portion; 100: housing; 110, 110K, 120: packaging material; 112: molded portion; 114, 114K: flange portion; 116K: valve device disposition portion; 130: peripheral bonded portion; 200, 200A, 200B, 200C, 200D, 200E, 200F, 200G, 200H, 200I, 200J: valve device; 210, 210A, 210B, 210C, 210E, 210F, 210G, 210H, 210I, 210J: valve function portion; 212: valve seat; 214: ball; 216: spring; 218: membrane; 220, 220A, 220B, 220C, 220D, 220E, 220F, 220G, 220H, 220I, 220J: seal attachment portion; 300: tab; 310: tab film; 400: power storage device element; A1, A2, A3, A4, A5, A6, A7: vent passage; C1: center line; O1: exhaust port.

The invention claimed is:

1. A valve device for a power storage device, the power storage device comprising a power storage device element and a housing in which the power storage device element is housed, the valve device for being attached to the housing of the power storage device, wherein
the valve device is configured to reduce an internal pressure of the housing when the pressure increases due to a gas generated inside the housing,
the valve device comprises:
a first portion in which a valve mechanism is formed, the valve mechanism being configured to reduce the internal pressure of the housing when the pressure increases due to a gas generated inside the housing; and
a second portion in which a vent passage is formed, the vent passage being configured to guide the gas generated inside the housing to the valve mechanism, wherein
the second portion has a wing-shaped extending end formed with a thickness that decreases toward an end in a width direction orthogonal to a thickness direction of the housing,
the housing is formed of a laminate including at least a base material layer, a barrier layer, and a heat-sealable resin layer in this order, and
such that an amount of helium leakage from a secondary side to a primary side of the valve device is $5.0 \times 10^{-11}$ Pa·m³/sec or more and $5.0 \times 10^{-6}$ Pa·m³/sec or less, as measured in a 25° C. environment.

2. The valve device for a power storage device according to claim 1, wherein the valve device is designed to be opened when a differential pressure between the primary side and the secondary side of the valve device is in a range of 0.05 to 1 MPa.

3. The valve device for a power storage device according to claim 2, wherein in a thickness direction of the power storage device, the first portion has a length greater than a length of the second portion, and
a step is formed at a boundary between the first portion and the second portion.

4. The valve device for a power storage device according to claim 2, wherein the second portion has a length in a width direction orthogonal to the thickness direction of the power storage device greater than the length of the second portion in the thickness direction of the power storage device.

5. The valve device for a power storage device according to claim 2, wherein the vent passage has a circular cross-sectional shape.

6. The valve device for a power storage device according to claim 2, wherein the vent passage has a cross-sectional length in the width direction orthogonal to the thickness direction of the housing greater than a cross-sectional length of the vent passage in the thickness direction of the power storage device.

7. The valve device for a power storage device according to claim 2, wherein the second portion has a pillar formed in the vent passage.

8. The valve device for a power storage device according to claim 2, wherein an outer surface of the second portion has a satin finish surface.

9. The valve device for a power storage device according to claim 2, wherein at least one ridge portion is formed to extend circumferentially on the outer surface of the second portion.

10. The valve device for a power storage device according to claim 2, wherein a corner in plan view of an end of the second portion opposite to the first portion is rounded.

11. The valve device for a power storage device according to claim 2, wherein a cross-sectional outer shape of the second portion is a polygon along a center line of the vent passage taken as the normal, and
corners of the polygon are rounded.

12. The valve device for a power storage device according to claim 2, wherein the first portion and the second portion are formed of different materials, and
the material of the first portion has a melting point higher than a melting point of the material of the second portion.

13. The valve device for a power storage device according to claim 2, wherein an outer surface of at least one of the first portion and the second portion at least partially forms a flat surface.

14. A power storage device comprising:
a power storage device element;
a housing in which the power storage device element is housed; and
a valve device that communicates with an inside of the housing, wherein
the valve device is configured to reduce an internal pressure of the housing when the pressure increases due to a gas generated inside the housing,
the valve device comprises:

a first portion in which a valve mechanism is formed, the valve mechanism being configured to reduce the internal pressure of the housing when the pressure increases due to a gas generated inside the housing; and a second portion in which a vent passage is formed, the vent passage being configured to guide the gas generated inside the housing to the valve mechanism, wherein the second portion has a wing-shaped extending end formed with a thickness that decreases toward an end in a width direction orthogonal to a thickness direction of the housing, the housing is formed of a laminate including at least a base material layer, a barrier layer, and a heat-sealable resin layer in this order, and the heat sealable resin layer is attached to the second portion such that an amount of helium leakage from a secondary side to a primary side of the valve device is $5.0 \times 10^{-11}$ Pa·m$^3$/sec or more and $5.0 \times 10^{-6}$ Pa·m$^3$/sec or less, as measured in a 25° C. environment.

* * * * *